United States Patent
Varma et al.

(10) Patent No.: US 10,598,166 B2
(45) Date of Patent: Mar. 24, 2020

(54) ATHEROFLUIDICS-ON-CHIP

(71) Applicant: Massachusetts Institute of Technology, Cambridge, MA (US)

(72) Inventors: Sarvesh Varma, Cambridge, MA (US); Joel Voldman, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 511 days.

(21) Appl. No.: 15/261,001

(22) Filed: Sep. 9, 2016

(65) Prior Publication Data

US 2017/0065976 A1 Mar. 9, 2017

Related U.S. Application Data

(60) Provisional application No. 62/216,333, filed on Sep. 9, 2015.

(51) Int. Cl.
*F04B 19/00* (2006.01)
*F16K 99/00* (2006.01)
(Continued)

(52) U.S. Cl.
CPC ...... *F04B 19/006* (2013.01); *B01L 3/502746* (2013.01); *F04B 43/12* (2013.01);
(Continued)

(58) Field of Classification Search
CPC ...... F04B 19/006; F04B 49/065; F04B 43/12; F04B 2205/09; F16K 99/0026;
(Continued)

(56) References Cited

U.S. PATENT DOCUMENTS 7,811,782 B2 10/2010 Blackman et al.
2003/0215941 A1 11/2003 Campbell et al.
(Continued)

FOREIGN PATENT DOCUMENTS

EP          2309130 A3     3/2013
WO   WO 2008/016703 A1    2/2008
WO        2014127250 A1   8/2014

OTHER PUBLICATIONS

Benam et al., "Engineered in Vitro Disease Models", *Annu Rev Pathol*, 10:195-262 (2015).
(Continued)

*Primary Examiner* — Michael L Hobbs
(74) *Attorney, Agent, or Firm* — Hamilton, Brook, Smith & Reynolds, P.C.

(57) ABSTRACT

Endothelial cells can become susceptible to disease when subjected to disturbed (atheroprone) blood flow patterns, which naturally occur in known locations in human arteries. Atheroprone flow is non-laminar, with low fluid shear stress magnitude and an oscillatory pattern representative in the temporal signature. At a macro-scale, atheroprone flow is multidirectional and chaotic. On the other hand, atheroprotective flow is laminar with high fluid shear stresses that have a specific temporal signature. Therefore, understanding the interplay between the atheroprotective and atheroprone hemodynamics and endothelial function is important. The invention relates, in some embodiments, to microfluidic devices and methods that dynamically apply controlled and physiologically relevant spatio-temporal atheroprone and atheroprotective flow signatures. Further, some embodiments according to the invention recreate these flow profiles upon different regions of the same cell culture, more closely resembling the in-vivo phenomenon.

12 Claims, 20 Drawing Sheets

(5 of 20 Drawing Sheet(s) Filed in Color)

(51) Int. Cl.
F04B 43/12 (2006.01)
F04B 49/06 (2006.01)
B01L 3/00 (2006.01)

(52) U.S. Cl.
CPC ........ F04B 49/065 (2013.01); F16K 99/0001 (2013.01); F16K 99/0026 (2013.01); F16K 99/0028 (2013.01); B01L 2200/0636 (2013.01); B01L 2400/06 (2013.01); B01L 2400/082 (2013.01); F04B 2205/09 (2013.01); F16K 2099/0084 (2013.01)

(58) Field of Classification Search
CPC ............... F16K 99/0028; F16K 99/001; F16K 2099/0084; B01L 3/502746; B01L 2200/0636; B01L 2400/082; B01L 2400/06

See application file for complete search history.

(56) References Cited

U.S. PATENT DOCUMENTS

| | | | |
|---|---|---|---|
| 2004/0259177 | A1 | 12/2004 | Lowery et al. |
| 2004/0262223 | A1 | 12/2004 | Strook et al. |
| 2007/0231783 | A1 | 10/2007 | Prabhakarpandian et al. |
| 2010/0323916 | A1 | 12/2010 | Garcia-Cardena et al. |
| 2011/0014600 | A1* | 1/2011 | Oh .................... B01L 3/502761 435/5 |
| 2013/0313452 | A1* | 11/2013 | Tice ........................ F16K 31/02 251/129.01 |
| 2014/0295483 | A1 | 10/2014 | Baker et al. |

OTHER PUBLICATIONS

Bhatia et al., "Microfluidic Organs-on-Chips", *Nat Biotechnol*, 32(8):760-72 (2014).
Blackman et al., "A New in Vitro Model to Evaluate Differential Responses of Endothelial Cells to Simulated Arterial Shear Stress Waveforms", *J Biomech Eng*, 124(4): 397-407 (2002).
Booth et al., "A Multiple-Channel, Multiple-Assay Platform for Characterization of Full-Range Shear Stress Effects on Vascular Endothelial Cells", *Lab Chip*, 14(11):1880-90 (2014).
Brooks et al., "Gene Expression Profiling of Vascular Endothelial Cells Exposed to Fluid Mechanical Forces: Relevance for Focal Susceptibility to Atherosclerosis", *Endothelium*, 11(1):45-57 (2004).
Caro et al., "Preliminary Comparative Study of Small Amplitude Helical and Conventional ePTFE Arteriovenous Shunts in Pigs", *J R Soc Interface*, 2(3):261-6 (2005).
Chen et al., "Cardiac-Like Flow Generator for Long-Term Imaging of Endothelial Cell Responses to Circulatory Pulsatile Flow at Microscale", *Lab Chip*, 13(15):2999-3007 (2013).
Chen et al., Swirling Flow Can Suppress Flow Disturbances in Endovascular Stents: A Numerical Study, *ASAIO J*, 55(6):543-549 (2009).
Chiu et al., "Analysis of the Effect of Disturbed Flow on Monocytic Adhesion to Endothelial Cells.", *J Biomech*, 36(12): 1883-95 (2003).
Chiu et al., "Effects of Disturbed Flow on Vascular Endothelium: Pathophysiological Basis and Clinical Perspectives", *Physiol Rev*, 91(1):1-106 (2011).
Chiu et al., "Vascular Endothelial Responses to Altered Shear Stress: Pathologic Implications for Atherosclerosis", *Ann Med*, 41(1):19-28 (2009).
Cunningham et al., "The Role of Shear Stress in the Pathogenesis of Atherosclerosis", *Lab Invest*, 85(1): 9-23 (2005).
Dai et al., "Distinct Endothelial Phenotypes Evoked by Arterial Waveforms Derived From Atherosclerosis-Susceptible and -Resistant Regions of Human Vasculature", *Proc Natl Acad Sci USA*, 101(41):14871-14876 (2004).
Davies et al., "A Spatial Approach to Transcriptional Profiling: Mechanotransduction and the Focal Origin of Atherosclerosis", *Trends Biotechnol*, 17(9):347-51 (1999).

Davies et al., "Turbulent Fluid Shear Stress Induces Vascular Endothelial Cell Turnover in Vitro", *Proc Natl Acad Sci USA*, 83(7):2114-7 (1986).
Davies P.F., "Hemodynamic Shear Stress and The Endothelium in Cardiovascular Pathophysiology", *Nat Clin Pract Cardiovasc Med*, 6(1): p. 16-26 (2009).
Davis et al., "Device-Based in Vitro Techniques for Mechanical Stimulation of Vascular Cells: A Review", *J Biomech Eng*, 137(4):040801 (2015).
Esch et al., "Organs-On-Chips at the Frontiers of Drug Discovery", *Nat Rev Drug Discov*, 14(4):248-60 (2015).
Estrada et al., "Endothelial Cell Culture Model for Replication of Physiological Profiles of Pressure, Flow, Stretch, and Shear Stress in Vitro", *Anal Chem*, 83(8):3170-7 (2011).
Foley et al., "Experimental and Model Investigation of the Time-Dependent 2-Dimensional Distribution of Binding in a Herringbone Microchannel", *Lab Chip*, 8(4):557-64 (2008).
Frangos et al., Shear Stress Induced Stimulation of Mammalian Cell Metabolism, *NASA, Washington, Microgravity Science and Applications Flight Programs*, Jan.-Mar. 1987, Selected Papers, vol. 1; p. 163-173.
Frazin et al., "Functional Chiral Asymmetry in Descending Thoracic Aorta", *Circulation*, 82(6):1985-1994 (1990).
Gallo et al., "Helical Flow in Carotid Bifurcation as Surrogate Marker of Exposure to Disturbed Shear", *J Biomech*, 45(14):2398-2404 (2012).
Garcia-Cardena et al., "Biomechanical Activation of Vascular Endothelium as a Determinant of Its Functional Phenotype", *Proc Natl Acad Sci USA*, 98(8): p. 4478-85 (2001).
Getz et al., "Animal Models of Atherosclerosis", *Arterioscler Thromb Vasc Biol*, 32(5):1104-15 (2012).
Gimbrone et al., "Vascular Endothelium, Hemodynamics, and The Pathobiology of Atherosclerosis", *Cardiovasc Pathol*, 22(1): 9-15 (2013).
Gomez-Sjoberg et al., "Versatile, Fully Automated, Microfluidic Cell Culture System", *Anal Chem*, 79(22):8557-63 (2007).
Huang et al., "Pulsatile Flows and Wall-Shear Stresses in Models Simulating Normal and Stenosed Aortic Arches", *Experiments in Fluids*, 48(3):497-508 (2010).
Kilner et al., "Helical and Retrograde Secondary Flow Patterns in the Aortic Arch Studied by Three-Directional Magnetic Resonance Velocity Mapping", *Circulation*, 88(5 Pt 1): 2235-2247 (1993).
Ku et al., "Pulsatile Flow and Atherosclerosis in the Human Carotid Bifurcation. Positive Correlation Between Plaque Location and Low Oscillating Shear Stress", *Arteriosclerosis*, 5(3):293-302 (1985).
Kwak et al., "Biomechanical Factors in Atherosclerosis: Mechanisms and Clinical Implications", *Eur Heart J*, 35(43):3013-3020, 3020a-3020d (2014).
Lee et al., "Microfluidic Mixing: A Review", *Int J Mol Sci*, 12(5):3263-87 (2011).
Libby et al., "Progress and Challenges in Translating the Biology of Atherosclerosis", Nature, 473(7347): 317-25 (2011).
Liu et al., "(Photo-)thermally Induced Formation of Dynamic Surface Topographies in Polymer Hydrogel Networks", *Langmuir*, 29(18):5622-9 (2013).
Liu et al., "Physiological Significance of Helical Flow in the Arterial System and Its Potential Clinical Applications", *Ann Biomed Eng*, 43(1): 3-15 (2015).
Lynn et al., Geometrical Optimization of Helical Flow in Grooved Micromixers, *Lab Chip*, 7(5):580-7 (2007).
Malek et al., "Hemodynamic Shear Stress and Its Role in Atherosclerosis", *JAMA*, 282(21): 2035-2042 (1999).
Morbiducci et al., "A Rational Approach to Defining Principal Axes of Multidirectional Wall Shear Stress in Realistic Vascular Geometries, With Application to the Study of the Influence of Helical Flow on Wall Shear Stress Directionality in Aorta", *J Biomech*, 48(6): 899-906 (2015).
Morbiducci et al., "Helical Flow as Fluid Dynamic Signature for Atherogenesis Risk in Aortocoronary Bypass. A Numeric Study", *J Biomech*, 40(3): p. 519-34 (2007).
Nagel et al., "Vascular Endothelial Cells Respond to Spatial Gradients in Fluid Shear Stress By Enhanced Activation of Transcription Factors", *Arterioscler Thromb Vasc Biol*, 19(8):1825-34 (1999).

(56) References Cited

OTHER PUBLICATIONS

Phelps et al., "Spatial Variations in Endothelial Barrier Function in Disturbed Flows in Vitro", *Am J Physiol Heart Circ Physiol*, 278(2):H469-76 (2000).
Research Report on Vascular Microfluidics dated Aug. 28, 2015.
Resnick et al., "Fluid Shear Stress and The Vascular Endothelium: For Better and For Worse", *Prog Biophys Mol Biol*, 81(3):177-99 (2003).
Shao et al., "Integrated Microfluidic Chip for Endothelial Cells Culture and Analysis Exposed to a Pulsatile and Oscillatory Shear Stress", *Lab Chip*, 9(21):3118-25 (2009).
Skommer et al. "Successes and Future Outlook for Microfluidics-Based Cardiovascular Drug Discovery", *Expert Opin Drug Discov*, 10(3):231-44 (2015).
Song et al., "Computer-Controlled Microcirculatory Support System for Endothelial Cell Culture and Shearing", *Anal Chem*, 77(13):3993-9 (2005).
Stott et al., "Isolation of Circulating Tumor Cells Using a Microvortex-Generating Herringbone-Chip", *Proc Natl Acad Sci USA*, 107(43):18392-7 (2010).
Stroock et al., "Chaotic Mixer for Microchannels", *Science*, 295(5555):647-51 (2002).
Truskey et al., "Characterization of a Sudden Expansion Flow Chamber to Study the Response of Endothelium to Flow Recirculation", *J Biomech Eng*, 117(2):203-10 (1995).
Vilahur et al., "Atherosclerosis and Thrombosis: Insights from Large Animal Models", *J Biomed Biotechnol*, vol. 2011, Article ID 907575 (2011).
Wang et al., "Spatially Resolved Shear Distribution in Microfluidic Chip for Studying Force Transduction Mechanisms in Cells", *Lab Chip*, 10(2):235-9 (2010).
Williams et al., "A Practical Guide to the Staggered Herringbone Mixer", *Lab Chip*, 8(7):1121-9 (2008).
Xu, Q., "Mouse Models of Arteriosclerosis from Arterial Injuries to Vascular Grafts", *Am J Pathol*, 165(1):1-10 (2004).
Yang et al., "Geometric Effects on Fluid Mixing in Passive Grooved Micromixers", *Lab Chip*, 5(10):1140-7 (2005).
Young et al., "Macro- and Microscale Fluid Flow Systems for Endothelial Cell Biology", *Lab Chip*, 10(2): 143-60 (2010).
Zhang et al., "A Microfluidic Shear Device That Accommodates Parallel High and Low Stress Zones Within the Same Culturing Chamber", *Biomicrofluidics*, 8(5):054106 (2014); 12 pages.
Brevig, T., et al., "Hydrodynamic Guiding for Addressing Subsets of Immobilized Cells and Molecules in Microfluidic Systems", BMC Biotechnology, vol. 3, 11 pages, Jul. 23, 2003.
Fede, C., et al., "An Easy-to-Handle Microfluidic Device Suitable for Immunohistochemical Procedures in Mammalian Cells Grown Under Flow Conditions", European Journal of Histochemistry 2014, vol. 58, 4 pages, Mar. 5, 2014.
Fillafer, C., et al., "An Acoustically-Driven Biochip—Impact of Flow on the Cell-Association of Targeted Drug Carriers", Lab Chip, 9(19):2782-2788, Oct. 2009.
Korin, N., et al., "Periodic "Flow-Stop" Perfusion Microchannel Bioreactors for Mammalian and Human Embryonic Stem Cell Long-Term Culture", Biomed Microdevices, 11:87-94 (2009).
Wang, L., et al., "Patterning Cells and Shear Flow Conditions: Convenient Observation of Endothelial Cell Remoulding, Enhanced Production of Angiogenesis Factors and Drug Response", Lab Chip, 11, 4235, 6 pages, Sep. 9, 2011.
Wong, K.H.K., et al., "Microfluidic Models of Vascular Functions", Annu. Rev. Biomed. Eng., 14:205-230, Apr. 23, 2012.

\* cited by examiner

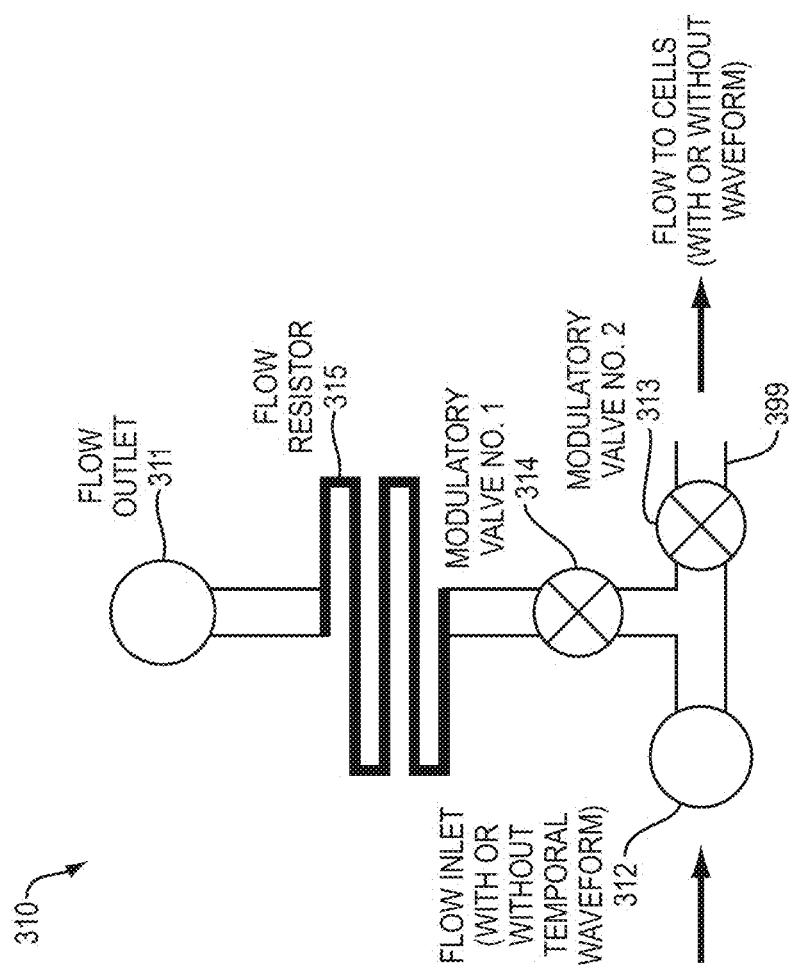

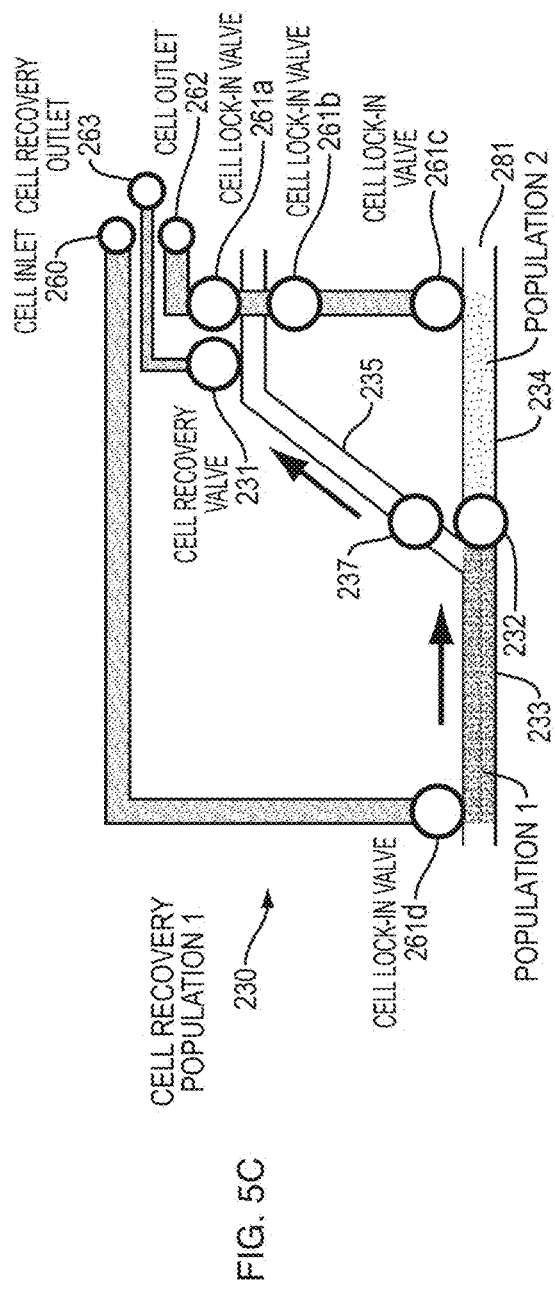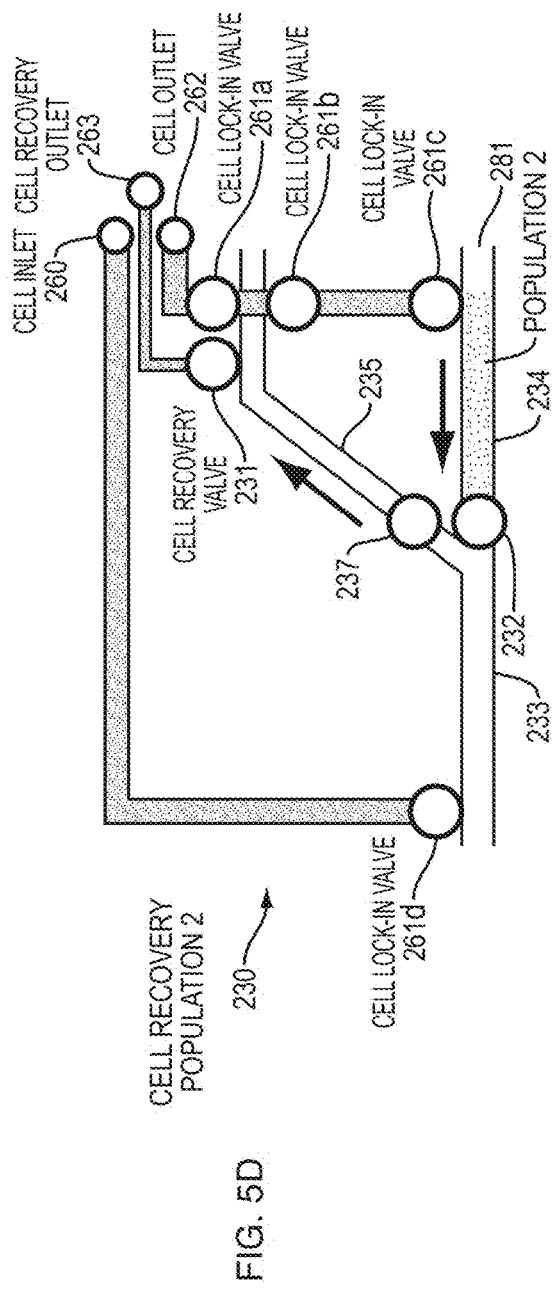
FIG. 5C
FIG. 5D

HELICAL FLOWS IN CHANNEL CROSS-SECTION

STAGGERED HERRINGBONE DESIGNS

HERRINGBONE DESIGNS

SLANTED GROOVE DESIGNS

HERRINGBONE DESIGN

CHAOTIC FLOW
0.5 dynes/cm2, OSI: 0

OSCILLATORY MULTIDIRECTIONAL FLOW
2 dynes/cm2, OSI: 0.33

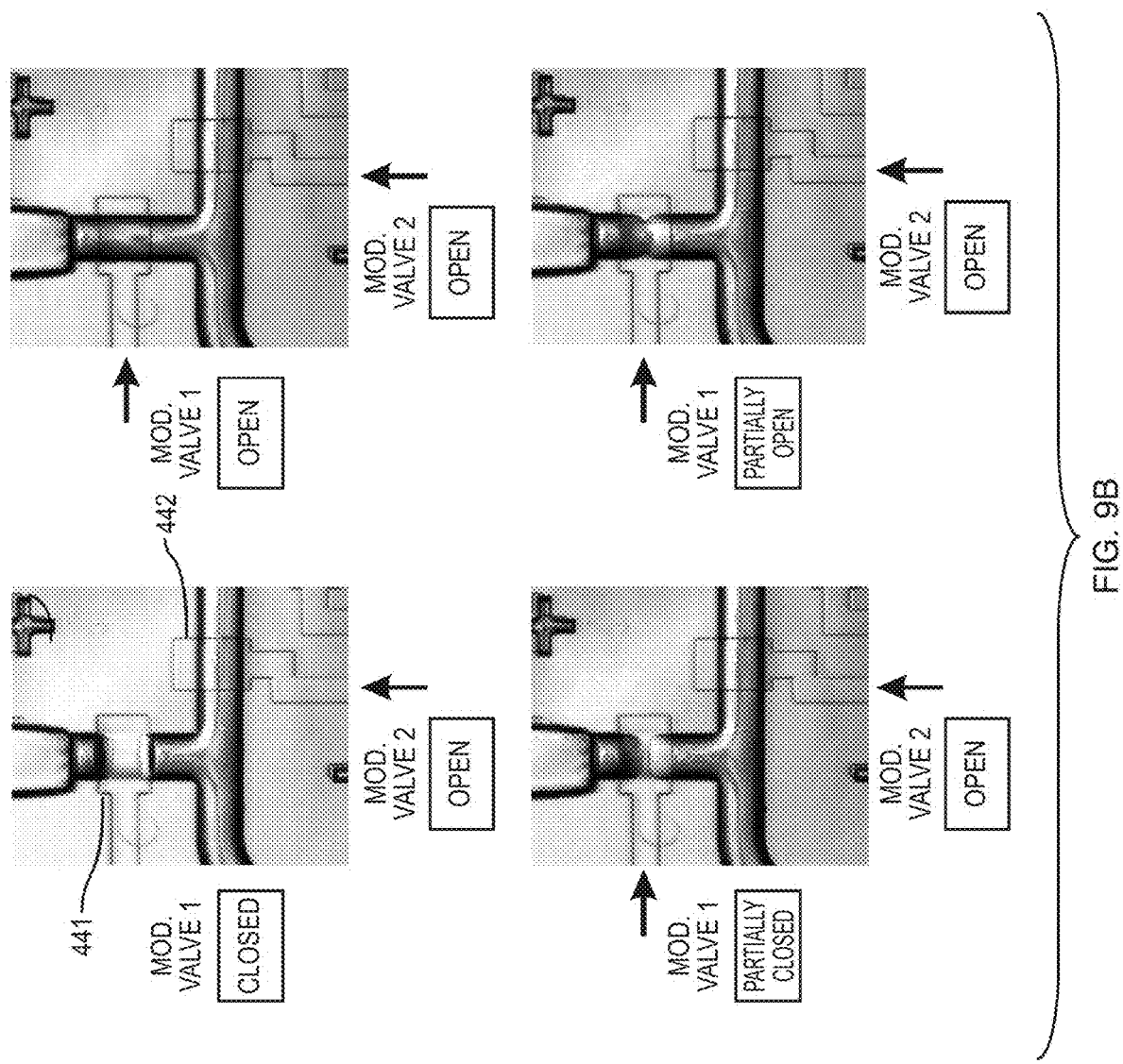

ATHEROFLUIDICS-ON-CHIP

RELATED APPLICATION

This application claims the benefit of U.S. Provisional Application No. 62/216,333, filed Sep. 9, 2015. The entire teaching of the above application is incorporated herein by reference in its entirety.

BACKGROUND

Cardiovascular diseases resulting from atherosclerosis remain the leading cause of deaths and morbidity worldwide. Disease is initiated due to a dysfunctional endothelium (cells at the inner lining of blood vessels) at atheroprone regions that allows for lipid/cholesterol leakage and accumulation, as well as sustained local inflammation. Atheroprone, and conversely atheroprotective, regions can be associated with characteristic flow patterns. The in vitro modeling of aspects of these characteristic blood flow patterns could provide an improved understanding of disease, as well as providing research and clinical benefits. Unfortunately, available methods for the in vitro reproduction of flow patterns suffer from various limitations. Accordingly, there is a need for new and improved methods and devices that can be used to reproduce specific flow patterns in vitro, such as, without limitation, atheroprone and atheroprotective flow.

SUMMARY

The invention relates to new and improved methods and devices for providing flow patterns in vitro. For example, some embodiments of the invention relate to microfluidic devices and methods that dynamically apply controlled and physiologically relevant spatio-temporal flow signatures, such as approximations of atheroprone and atheroprotective flow. Cells, e.g., endothelial cells, can be introduced into these devices, and the effects of these spatio-temporal flow signatures on the cells can be studied. Optionally, different flow profiles can be imposed upon different regions of the same flow device, e.g., in adjacent regions of a cell culture (optionally in a monolayer), thereby even more closely resembling, or simulating, the in vivo phenomenon.

In one embodiment, the invention relates to a flow modulator, comprising: an inlet for receiving an input flow; an outlet for discharging an output flow, the outlet being in fluid communication with the inlet; and a control module capable of controlling an amplitude and a frequency of the output flow. Optionally: (1) the input flow is received from a pump; (2) the flow modulator is a microfluidic device; (3) the flow modulator comprises an outlet conduit connected to the outlet and having an end adapted for connection to a microfluidic port; and (4) the control module comprises a valve, further optionally wherein the control module is capable of adjusting the valve to at least an open position and a closed position, and, if desired to an intermediate position as well, and optionally the control module is capable of adjusting the valve according to a predefined program.

In another embodiment, the invention relates to a method of modulating an output flow, comprising: receiving an input flow; and using a control module, setting a frequency and an amplitude of the output flow. Optionally: (1) the setting varies dynamically for at least one of the amplitude and the frequency, further optionally wherein the output flow is transmitted to a microfluidic device; (2) the microfluidic device further comprises a control module; (3) the input flow is uniform, further optionally wherein the output flow is nonuniform; and/or (4) the input flow is nonuniform, further optionally wherein the output flow is uniform.

In another embodiment, the invention relates to a flow modulator comprising: a main port; a discharge port connected to the main port via a main line, the main line having a discharge valve between the main port and the discharge port; and a supplemental port connected via a supplemental valve to the main line at a location between the main port and the discharge valve. Optionally: (1) the flow modulator is a microfluidic device, further optionally wherein the flow modulator comprises a valve controller, and yet further optionally, wherein the valve controller is capable of adjusting a fluid flow through the discharge valve and a fluid flow through the supplemental valve; and/or (2) the flow modulator comprises a conduit having an upstream port and a downstream port, the downstream port being connected to the main port of the flow modulator.

In another embodiment, the invention relates to a method of modulating an oscillatory flow in a conduit having an upstream end and a downstream end, comprising: attaching a flow modulator to the downstream end of the conduit; introducing a fluid stream into the upstream end of the conduit; and operating the flow modulator to modulate at least one of a fluid pressure and a resistance at the downstream end of the conduit, thereby generating an oscillatory flow, wherein the oscillatory flow in the conduit oscillates between a first maximum velocity along the conduit and a second maximum velocity along the conduit, optionally wherein: (1) the first maximum velocity and the second maximum velocity are both in a downstream direction, or (2) wherein the first maximum velocity is in an upstream direction.

In another embodiment, the invention relates to a cell culture platform comprising: a flow conduit having an upstream port and a downstream port; and a branch conduit in fluid communication with the flow conduit downstream from the upstream port, optionally wherein: (1) the cell culture platform comprises an upstream flow modulator in fluid communication with the upstream port; and/or (2) the cell culture platform comprises a downstream oscillatory flow generator in fluid communication with the downstream port; (3) the cell culture platform is a microfluidic device; (4) a section of an interior surface of the flow conduit has a grooved texture, further optionally: (a) wherein the grooved texture comprises a herringbone pattern; and/or (b) wherein the grooved texture is capable of inducing a multidimensional flow pattern in an applied laminar flow, and, if desired, wherein the multidimensional flow pattern is a helical flow pattern.

In yet another embodiment, the invention relates to a method of operating a cell culture platform, comprising: introducing cells in a section of a flow conduit having an upstream end and a downstream end; inducing a laminar, high shear flow in the upstream end; and inducing a low-oscillatory flow in the downstream end.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a schematic diagram of a Flow Waveform Generator Module in accordance with an embodiment of the invention.

FIGS. 5A-5D are schematic diagrams of various operations of the Cell Culture Module in accordance with an embodiment of the invention.

FIG. 9B illustrates possible scenarios when Mod. Valve 2 is kept open, while Mod. Valve 1 is either fully open, fully closed, partially open or partially closed, according to aspects of the invention.

DETAILED DESCRIPTION

For clarity of description, example embodiments are presented in the figures and below discussions. These examples are for purposes of illustration and not a limitation of the principles of the present invention. A description of example embodiments of the invention follows.

The teachings of all patents, published applications and references cited herein are incorporated by reference herein in their entirety.

Figure 1A:
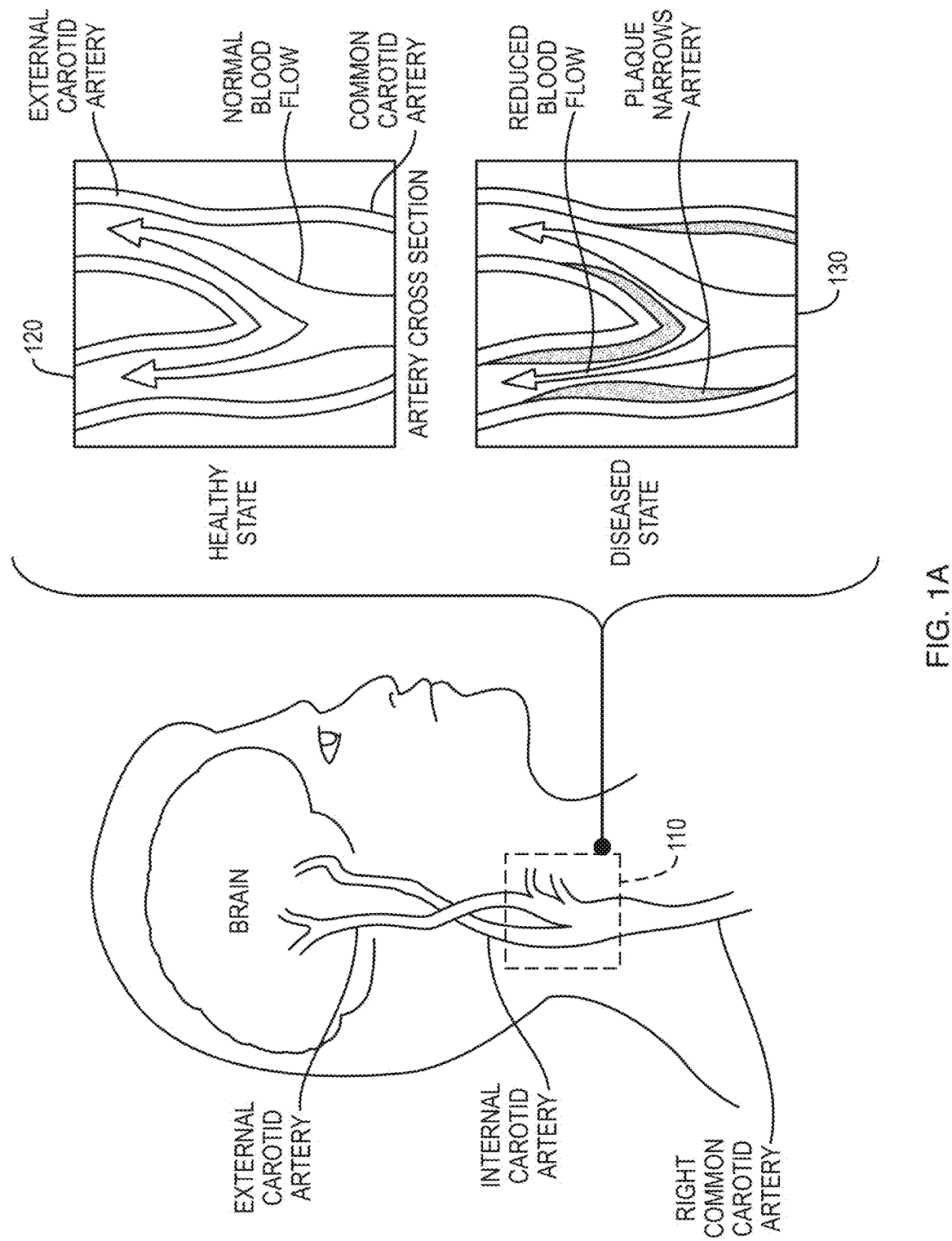
FIG. 1A is an illustration of cross sections of a healthy human artery and a human artery showing disease prone regions.
Figure 1B:
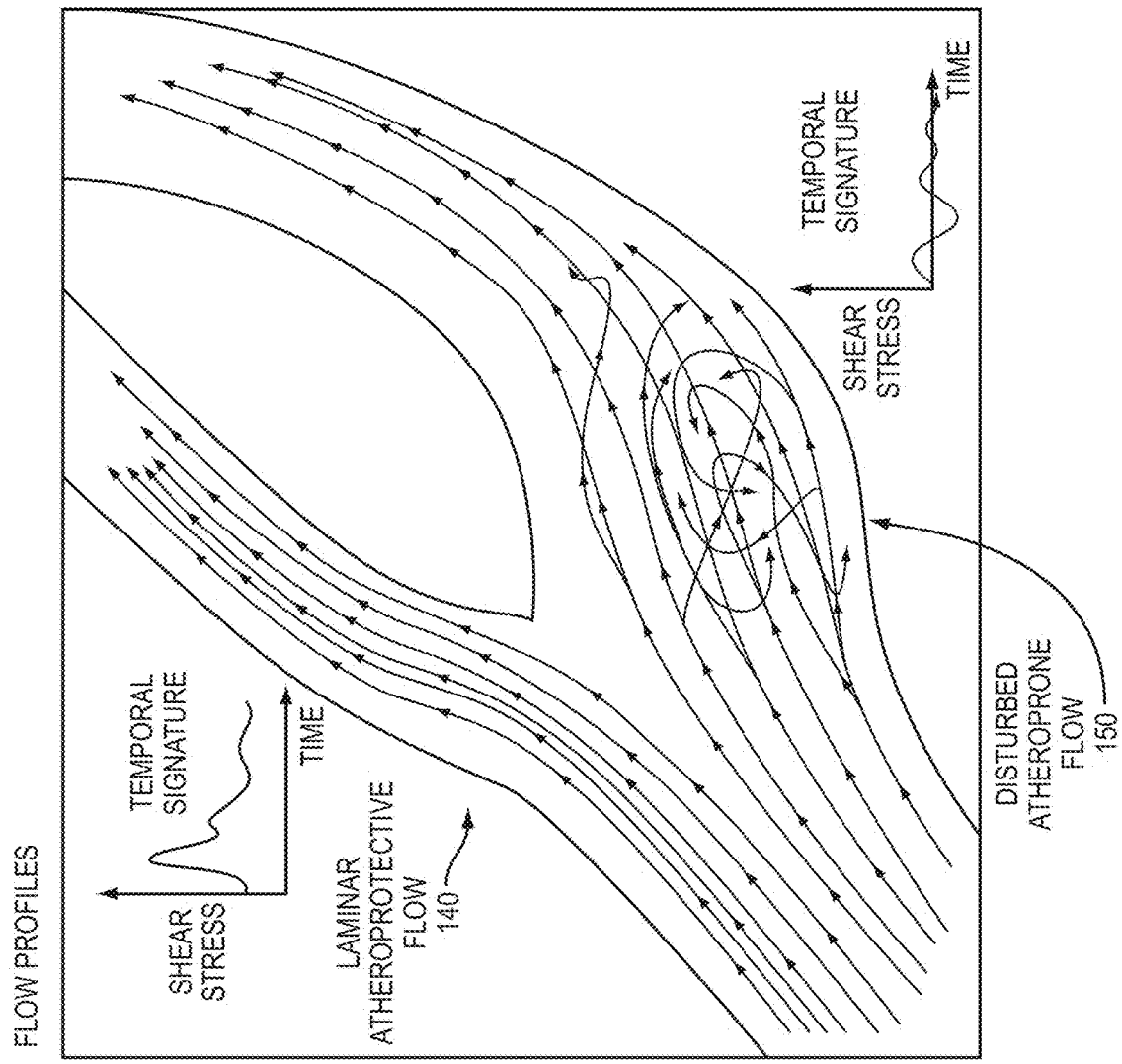
FIG. 1B is an illustration of atheroprotective and atheroprone fluidic flows within an artery.

Endothelial cells can become susceptible to disease when subjected to disturbed (atheroprone) blood flow patterns, which naturally occur in known locations in human arteries. Atheroprone flow is non-laminar, with low fluid shear stress magnitude and with an oscillatory pattern representative in the temporal signature. FIG. 1A is an illustration of a human carotid bifurcation 110 and cross sections of the healthy artery 120 and the artery showing disease prone regions 130 (susceptible to plaque formation). FIG. 1B is an illustration of atheroprotective 140 and atheroprone 150 fluidic flows within an artery.

The interaction of endothelial cells with the spatiotemporal hemodynamics of the vasculature has been an area of immense research in the past half century, owing to its significant implications towards cardiovascular pathologies, and therefore towards human health. Hemodynamic flow patterns (laminar, disturbed, etc.) and consequent fluid shear stresses are major regulators of endothelial function, which bears high prognostic value for the progression of diseases such as atherosclerosis[1-4]. Specifically, innate laminar (atheroprotective) flow profiles initiate antioxidant and anti-inflammatory pathways whereas disturbed (atheroprone) flows result in oxidative stress, hyperlipidemia, and an overall pro-inflammatory state [5-7]. From several clinical imaging studies of healthy volunteers and atherosclerotic patients, atheroprotective flow has been characterized having laminar profiles with high fluid shear stresses with a specific temporal signature that emerges from each cardiac cycle [8]. At the macro-scale, atheroprotective flow follows a helical pattern as it traverses through the vasculature [9-12]. This has guided the designs for a number of commercial endovascular grafts and stents (such as SwirlGraft and BioMimics 3D stent, Veryan Medical Ltd.). On the other hand, atheroprone flow is found to be non-laminar, with low fluid shear stress magnitude and with an oscillatory pattern representative in the temporal signature [8, 13]. At a macroscale, atheroprotective flow is laminar with high fluid shear stresses that have a specific temporal signature emerging from each heartbeat. Spatially, atheroprotective flow traverses blood vessels in a helical pattern. At a macro scale, atheroprone flows are multidirectional and chaotic, with loss of the helical flow profiles [14-16].

With this context, understanding the interplay between the atheroprotective and atheroprone hemodynamics and endothelial function is of prime significance. This knowledge can be crucial for a number of practical applications, such as, discovery and screening of pharmacological entities that treat endothelial diseases [5].

Despite decades of research in atherosclerosis, naturally available models that satisfactorily represent human vascular diseases still have not been found. Animal models do not allow for controllable hemodynamic flow conditions and offer partial relevance to human atherosclerosis pathophysiology [17, 18]. In vitro systems such as cone-plate viscometers [24], parallel plate flow chambers [25], vertical-step flow devices [26], etc. are limited in the flow patterns they can create, do not adequately mimic in vivo flow profiles, and systems are typically bulky, which limit extensive, scalable and parallelized studies.

Platforms and methods according to some embodiments of the invention enable the study of biological phenomenon under complex, yet controllable fluid flow conditions. For example, some embodiments of the invention allow customization of aspects of atheroprotective and atheroprone flow profiles, such as their temporal waveforms with precise time-averaged shear stress magnitude, as well as unique spatial flow signatures.

In some embodiments, the combined use of device modules allow for unprecedented studies directly upon primary human cells, leading to insight on human pathophysiology. Some embodiments are microscale devices that allow for inexpensive experimentation due to lowered reagent costs, and offer the potential for multiplexed assays.

Some embodiments in accordance with the invention enable monitoring of desirable biological phenomenon in real time and enable the recovery of cells from specific flow regions, thereby enabling specific off-chip assays. According to some embodiments of the invention, if the perfused liquids contain interacting species (including but not limited to beads, cells, nanoparticles, pathogens, or drugs), further insight may be drawn about biological interactions in such context from short-term to long-term durations.

A device or platform in accordance with an embodiment of the invention has a cell culture chamber with its own controlled fluidic environment. The cell culture chamber may be arrayed within a microfluidic device, lending itself for parallelized real-time assessment of cell biology through microscopy-based assays as well as molecular assays.

Considering the recent advent and advancement of 'organ-on-a-chip' platforms, embodiments of the invention provide an ability to study vascular-like flows directly upon human cells [55, 56]. With respect to human endothelial pathologies and cardiovascular diseases such as atherosclerosis, some embodiments of the invention provide a relevant and representative in vitro experimental platform for a variety of clinical, research, and pharmaceutical applications, including fundamental biological studies, clinically relevant pharmacological studies, and personalized medicine.

Cell Culture Module

Figure 2:
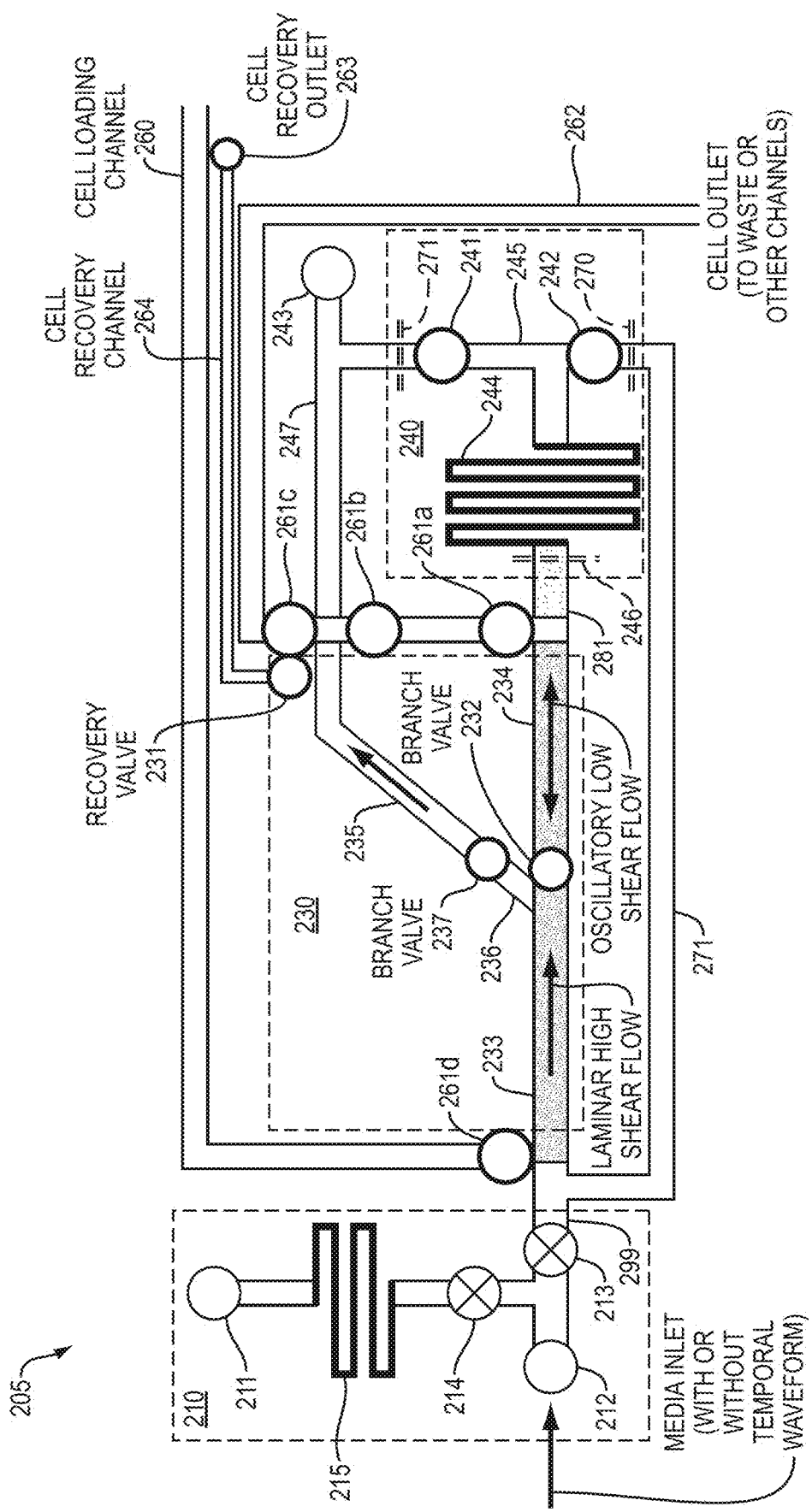
FIG. 2 is a schematic diagram of a microfluidic platform in accordance with an embodiment of the invention.

FIG. 2 is a schematic diagram of a device in accordance with an embodiment of the invention. The device 205 includes a Cell Culture Module 230 flanked by a Flow Waveform Generator Module 210 and a Low-Oscillatory Flow Generator Module 240. The Flow Waveform Generator 210 and Oscillatory Flow Generator 240 modules include on-chip valves (213, 214, 241 and 242). The modulation of the on-chip valves (e.g., dynamic modulation) recreates specific flow conditions within regions of the Cell Culture Module 230. One of skill in the art will appreciate that a wide variety of valves, or other devices, e.g., gating devices, can be used. As one example, microfluidic valves can be used.

In one embodiment the Cell Culture Module 230 includes three branches 233, 234 and 235. In some embodiments, the left branch 233 experiences unidirectional high shear fluidic flow, the lower right branch 234 experiences oscillatory low-shear fluidic flow, and the top right branch 235 serves primarily as a fluidic outlet. Regions of the Cell Culture Module 230 experience flows with profiles similar to atheroprotective and atheroprone fluidic flows. In some embodiments, the Cell Culture Module 230 incorporates unidirectional and/or bidirectional fluidic flows. In other embodiments, the Cell Culture Module 230 is configured to provide one or more of: unidirectional flow, bidirectional flow, and multidirectional flow (e.g., flow with a component transverse to the main longitudinal flow axis). Cells from the same cell monolayer experiencing different fluidic flow conditions (atheroprotective and atheroprone) can be selectively recovered from the Cell Culture Module 230, for example by using the cell recovery channel 264, which is gated on opposite ends by recovery valve 231 and cell recovery outlet 263. The device 205 is scalable for experiments requiring large cell-numbers, and it can also be arrayed within a microfluidic device for parallelized experimentation with a variety of cell cultures and/or fluidic flow conditions. It should be appreciated that a wide variety of flow patterns can be established in each of the left 233 and right 234 branches. In some embodiments, the flow profile is invariant across the length of each of branch 233 and branch 234. When cells cover branches 233 and 234, individual cells in a given branch therefore experience a similar profile, while the cell groups in 233 and 234 experience different profiles from each other.

The Flow Waveform Generator Module

FIG. 3A is an enhanced schematic view of the Flow Waveform Generator Module 210/310 from FIG. 2. Flows with or without a temporal shear stress pattern enter the module 210/310 through the flow inlet 212/312. Flow outlet 211/311 is connected to a fluid outlet, but can also be routed to another part of the device. Dynamic modulation of on-chip valves, including Mod. Valve 1 (214/314) and Mod. Valve 2 (213/313), controls the flow output temporal waveform. Dynamically modulating a valve includes controlling the position of the valve, ranging from fully open to fully closed and determines the flow rate of fluidic flow passing through the valve, also known as its "leakiness." The flow rate correlates directly with the fluid shear stress. Therefore, dynamically regulating the relative flow rates between Mod. Valve 1 (214/314) and Mod. Valve 2 (213/313) generates dynamically modulated fluid shear stresses. The dynamically modulated shear stress waveform is routed via outlet 299/399 to a Cell Culture Module (e.g., Module 230 as shown in FIG. 2).

A valve's position can range anywhere between fully open to fully closed. With respect to FIG. 3A, for example, if Mod. Valve 2 (313) is fully open, then dynamic modulation of Mod. Valve 1 (314) varies the flow rate through Mod. Valve 2 (313), thereby providing a particular temporal shear stress waveform at outlet 399. If valves 313 and 314 both allow flow, the flow entering the Flow Inlet 312, e.g., from a pump, is split into two flows: (1) a flow through Mod. Valve 1 (314) and subsequently to flow outlet 311; and (2) a flow through Mod. Valve 2 (313) and ultimately through outlet 399, which can be joined to the inlet of a Cell Culture Module, e.g, Module 230 in FIG. 2. When both valves are fully open, the fluidic resistance of Flow Resistor 315 prevents the entire flow through Flow Inlet 312 from undesirably being routed towards the "bleed through" flow outlet 311. When both valves are fully open, the ratio of flow rates of between the flows through each valve (313, 314) is set according to the predetermined fluidic resistance towards flow outlet 311 (such as that of Flow Resistor 315) and the downstream resistance of the load attached to outlet 399. When the valves are partially open, modulating the positions of Mod. Valve 1 and 2 (313, 314), respectively, modulates the net fluidic resistance in each valve's respective fluidic path.

As will be appreciated by those skilled in the art, the net fluidic resistance in each valve's respective fluidic path may be provided and modulated by various methods and configurations. In one example, the fluidic resistance provided by Flow Resistor 215/315 may be provided instead by replacing Flow Resistor 215/315 with modulation valves in series with Mod. Valve 1 (314).

FIG. 3A illustrates one example configuration having two valves (313 and 314). As will be appreciated by those skilled in the art, the number and configuration of valves and the configuration of fluidic networks encompassed within the Flow Waveform Generator Module, as well as fluidic networks shared between the Flow Waveform Generator Module and other components, may be designed and implemented according to the specifications and constraints of the particular application. Referring to FIG. 3A and the previously discussed example where Mod. Valve 2 (313) is fully open, then dynamic modulation of Mod. Valve 1 (314) varies the flow rate through Mod. Valve 2 (313), thereby providing a particular temporal shear stress waveform at outlet 399. In this scenario, the functionality of Mod. Valve 2 (313) may be provided instead by a fluidic network with valves exclusive to the fluidic network. Or, the functionality of Mod. Valve 2 (313) may be provided instead by a fluidic network with a combination of valves shared with other fluidic networks.

Figure 3B:
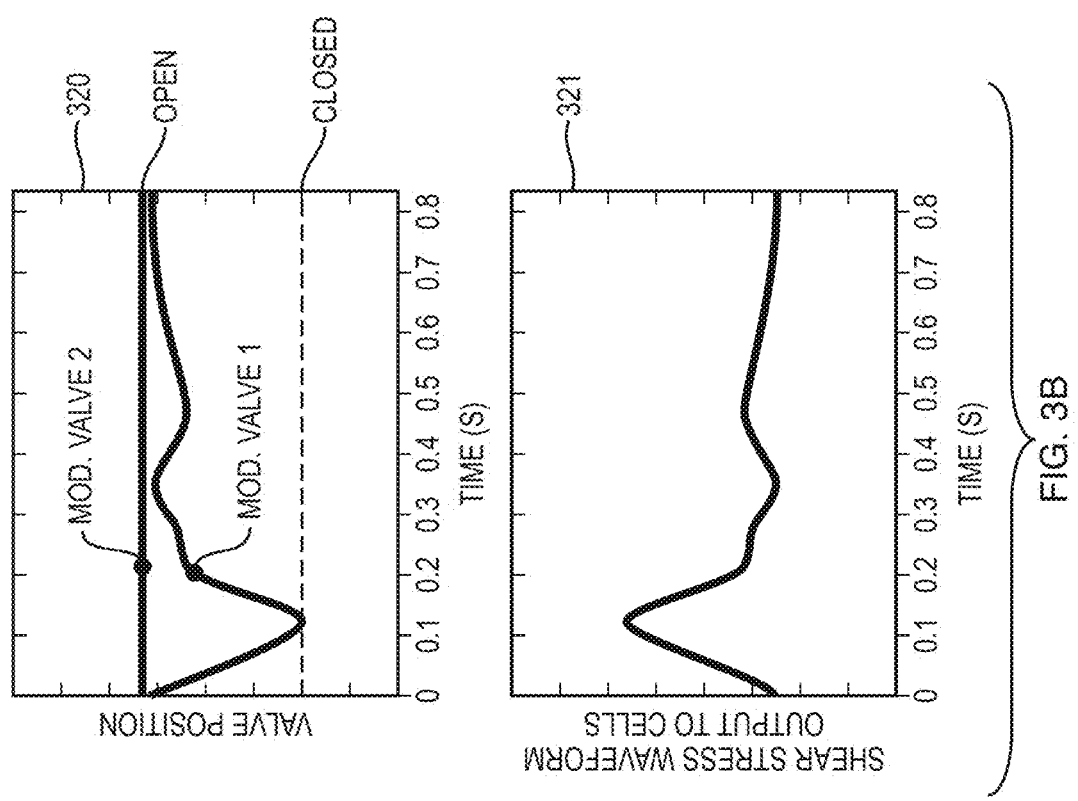
FIG. 3B is an illustration of time-varying valve modulation of Mod. Valve 1 and Mod. Valve 2 in the Flow Waveform Generator Module and the corresponding output shear stress waveform.

FIG. 3B illustrates an example of waveform generation by modulating the positions of Mod. Valve 1 and Mod. Valve 2. Graph 320 shows the time-varying modulation of Mod. Valve 1 (314) and Mod. Valve 2 (313). Graph 321 shows the corresponding shear stress waveform of the flow routed to the cells in the Cell Culture Module via outlet 371.

Flow Waveform Generator Module 310 enables the generation of flows with user-defined arbitrary shear stress temporal waveforms having controllable frequency and amplitude. In some embodiments, the input flow at Flow Inlet 312 already has temporal waveform. In other embodiments, it does not. The temporal waveform, if present, may or may not have been intentionally applied. It could arise, for example, from the source used to generate fluidic pressure input to the module. If the incoming input flow does have a temporal waveform, dynamic modulation Mod. Valve 1 (314) and Mod. Valve 2 (313) can be used to remodel the waveform into a desired temporal waveform, including, for example, a time-invariant (flat) waveform.

As will be appreciated by those of ordinary skill in the art, the dimensions and material compositions of the fluidic channels, modulation valves and fluidic resistance elements may be determined according to the particular needs of the application.

Some parallel-late (macro- or micro-scale) systems, apply temporal waveforms to flows with dynamic control of fluidic pumps. However, mechanical compliance of the fluidic connectivity between a pump and the device may undesirably dampen various temporal frequencies of the applied waveform. Some microfluidic devices use on-chip peristaltic valves for temporal modification of flows [32, 36], however these systems fail to generate the large shear stresses relevant for large vessel flows because the valves function as high flow-rate producing fluidic pumps.

Advantageously, some embodiments in accordance with the invention can include one or more of the following aspects:

1. Ability to apply a temporal waveform upon a uniform input flow and directly transpose it without distortion upon cell culture.

2. Ability to correct undesirable distortions in an input flow resulting from an externally applied fluidic waveform.

3. Ability to maintain shear stresses with magnitudes relevant for large vessel flows by applying a waveform upon an input flow from any flow source with the input flow having a predefined flow rate.

In embodiments, by decoupling the source of the flow generation (e.g., a pump) from the source of waveform generation, a great variety of waveforms can be achieved, including in a range of pressures. Accordingly, in some embodiments flow generators can modulate characteristics of flow (e.g., pressure, amplitude, frequency, shear stress) without necessarily providing the initial flow impulse, which can be provided external to the flow generator, e.g. by a pump. In this regard, some embodiments serve to generate a waveform (e.g., by modulating an external flow/pressure input). A variety of pump types can be used with waveform generators. For example, the pump can be a: positive displacement pump, rotary-type positive displacement pump (e.g., internal gear, screw, shuttle block, flexible vane or sliding vane, circumferential piston, flexible impeller, helical twisted root (e.g., Wendelkolben pump), liquid ring vacuum), a reciprocating-type positive displacement pump (e.g., piston, diaphragm, piston, radial piston); linear-type positive displacement pump (e.g., rope pump, chain pump); rotary lobe pump; progressive cavity pump; rotary gear pump; gear pump; hydraulic pump; rotary vane pump; regenerative (peripheral) pump; peristaltic pump; impulse pump; hydraulic ram pump; airlift pump; velocity pump; axial-flow pump; mixed-flow pump; eductor-j et pump; gravity pump; or valveless pump. The pressure output from a waveform generator in accordance with aspects of the present invention can be, without limitation, any range of pressures tolerated by the device based on the material compositions and fabrication process of various device components.

Low-Oscillatory Flow Generator Module

Low and oscillatory fluid shear stress is a prominent feature of atheroprone flows. Oscillatory flows are typically quantified by a metric called oscillatory shear index (OSI) [13], which represents the net fraction of time local shear stress acts in the opposite (cross or reverse) direction with respect to the overall flow direction. For example, a purely oscillatory flow has an OSI of 0.5, implying that the flow spends the same fraction of time forward as backward, and therefore has no net flow. Clinically, atheroprone regions are found to have OSI indices typically ranging from 0.2-0.4, whereas atheroprotective regions are generally void of oscillatory flow. Embodiments according to the invention generate flows with OSI indices typical of atheroprone regions.

Figure 4A:
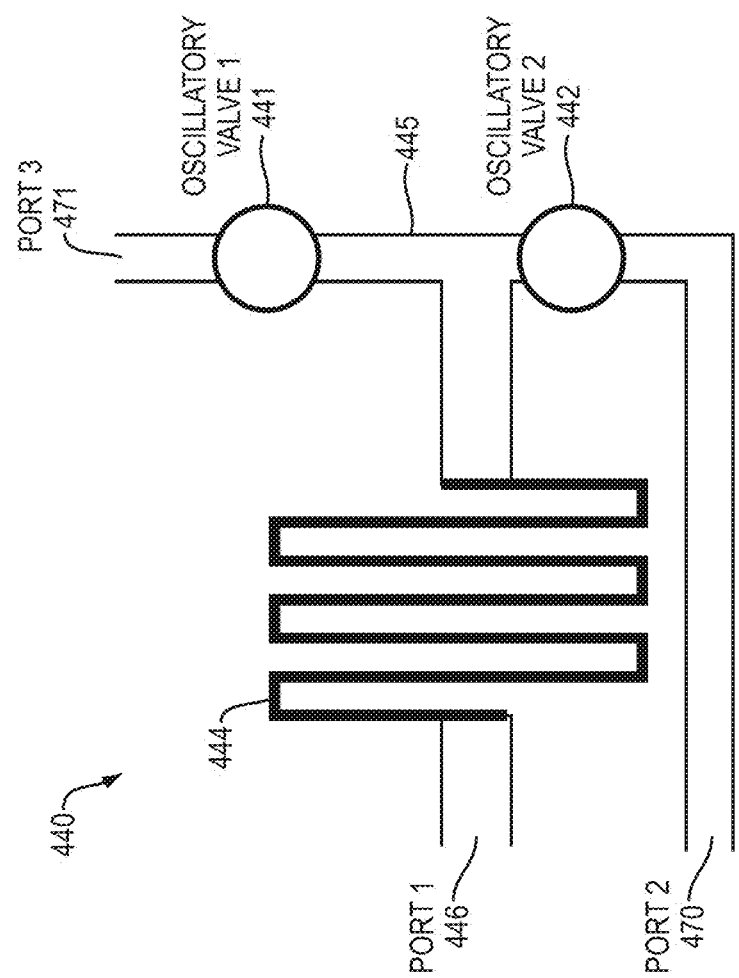
FIG. 4A is a schematic diagram of the Low-Oscillatory Flow Generator Module in accordance with an embodiment of the invention.

FIG. 4A is a schematic diagram of a Low-Oscillatory Flow Generator Module 440 according to one embodiment of the invention. Module 440 includes three ports 446, 470 and 471. Referring also to FIG. 2, Port 1 (246/446) can be connected to a Cell Culture Module (230) via channel 281, and Port 2 (270/470) can be connected directly to an outlet e.g., outlet 399, of the Flow Waveform Generation Module 210/310, e.g., via shunt 271/371. It should be appreciated that a number of configurations are possible, including a connection of Port 470 to an independent pressure source (pump), connection to a pressure source upstream of the input 212 to the flow generator module, and (as shown in FIG. 2) connection to a region of flow path between the output of the Flow Waveform Generator Module (e.g. FIG. 2, 210) and the Cell Culture Module (e.g. FIG. 2, 230). Port 3 (271/471) is connected to a fluid outlet, but can also be routed to another part of the device shown in FIG. 2.

As shown in FIG. 2, an embodiment of the Low-Oscillatory Module 240 provides oscillatory flow with low shear stress to the lower right branch 234 of the Cell Culture Module 230. Oscillatory ("Osc.") Valve 1 (241/441) and Osc. Valve 2 (242/442) can be toggled between the two configurations shown in FIG. 4B. In this embodiment, each Oscillatory Valve is fully open or fully closed, although in other embodiments, valve closure can be partial.

The oscillatory flow feature and the high/low magnitude shear stress features are not mutually dependent. Depending on the design of the channels and various components in the device (e.g. FIG. 2, 205), some embodiments according to the invention can generate flows having any combination of shear stress magnitude and oscillatory/non-oscillatory characteristics including high shear stress oscillatory flow and low shear stress non-oscillatory flow conditions. For example, in some embodiments, the lower right branch (FIG. 2, 234) experiences flow conditions with the same or higher shear stress magnitude as the flow conditions experienced in the lower left branch (FIG. 2, 233).

Figure 4B:
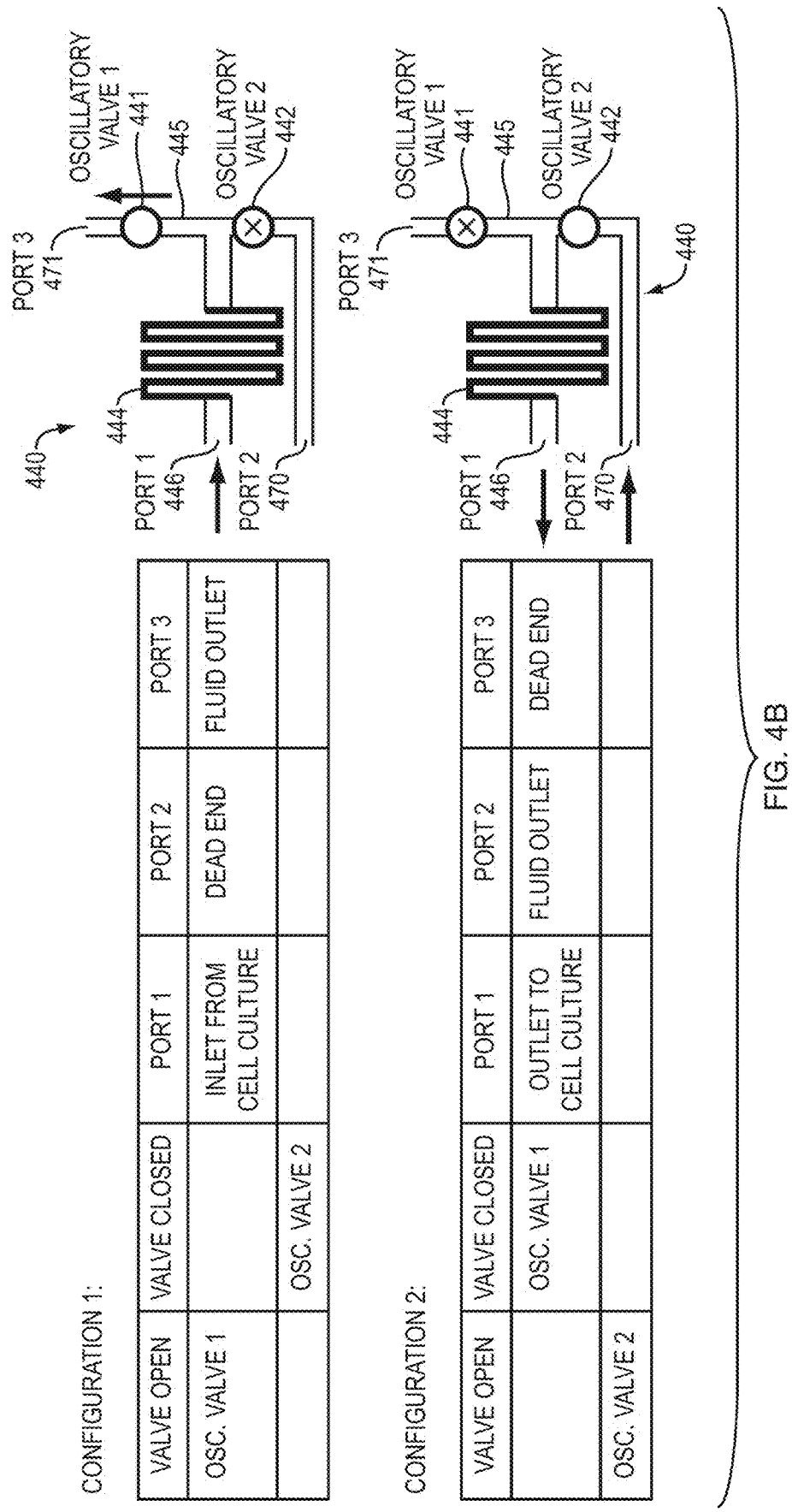
FIG. 4B is an illustration of two operating configurations of valves in the Low-Oscillatory Flow Generator of an embodiment of the invention and the corresponding fluidic flows.

In the first configuration, shown in FIG. 4B, Osc. Valve 1 (241/441) is open, while Osc. Valve 2 (242/442) is closed. As can be seen with further reference to FIG. 2, the left branch 233 of the Cell Culture Module 230 experiences a unidirectional flow that could have high shear stress. The flow from the left branch 233 continues in part to the top right branch 235 of the Cell Culture Module 230 and in part through Port 1 (246/446), which acts as an inlet from Cell Culture Module 230. The flow from Port 1 (246/446) exits Module 240/440 through Port 3 (271/471) and is routed to an on-chip location or an off-chip fluidic outlet.

In the second configuration, also shown in FIG. 4B, the valves 241/441 and 242/442 simultaneously toggle their switch states. This diverts part of the flow entering the Cell Culture Module 230 (at the upstream end of the left branch 233) into shunt 271 which directs the diverted flow through Port 2 (270/470) of the Generator Module. In some embodiments, switching between the two configurations shown in FIG. 4B will keep flipping the flow direction at Port 1 (246/446) and thereby, the direction of the flow in the lower right branch 234 of the Cell Culture Module 230. In other embodiments, the direction of flow in branch 234 does not change, but its magnitude oscillates about a central mean.

The fluidic resistance of Resistor (244/444) decreases the flow rate (and hence fluid shear stress magnitude) through the lower right branch 234 of the Cell Culture Module 230. Referring to the embodiment shown in FIG. 2, if the fluidic resistance of the Resistor 244 is 8-fold higher than that of the top right branch 235 of the Cell Culture Module 230, then the fluid shear stress magnitude experienced in the lower right branch 234 will be 8-fold lower than the fluid shear stress magnitude experienced in the left branch 233 of the Cell Culture Module 230, regardless of the flow direction. In this manner, the fluidic resistance value of Resistor 244 ensures lower fluid shear stress in lower right branch 234, thereby providing a flow with a key aspect of atheroprone flows.

Adjusting the switching frequency of Osc. Valve 1 (241/441) and Osc. Valve 2 (242/442) is one way to control the overall directionality of the flow in the lower right branch 234. The relative duration of Configurations 1 and 2, as shown in FIG. 4B, controls the flow OSI in the lower right branch 234. For example, if Configuration 1 and 2 are maintained for the exact same duration, then in some embodiments there will be no net direction of the flow in the lower right branch 234, leading to a purely oscillatory flow with OSI of 0.5. In this manner, the switching of the valves 241/441 and 242/442 can generates flows with a wide variety of OSI upon the cell culture in Cell Culture Module 230. Additionally, synchronizing the switching of valves 241/441 and 242/442 with the modulation of valves 213/313 and 214/314 in Flow Waveform Generator Module 210 further fine tunes the shear stress profile of the flow in the lower left branch 233. The combination of Flow Waveform Generator 210 and Module 240 can generate oscillatory flows with a controllable OSI and a low magnitude shear stress, which are two key aspects of atheroprone flows.

It should be further appreciated that in the example embodiments of the Cell Culture Module 230 shown in FIG. 2 and FIG. 5, the branch valves 232 and 237 can be tuned to adjust flow profiles by changing the fate of fluid exiting the downstream end of the left branch 233; to the extent that if branch valve 237 is relatively more open than 232, there is increased flow through right branch 234.

As will be appreciated by those skilled in the art, the net fluidic resistance in each valve's respective fluidic path may be provided and modulated by various methods and configurations. In one example, the fluidic resistance provided by Resistor (244/444) may be provided instead by replacing Resistor (244/444) with modulation valves in series after Port 1 (246/446) and before branch (245/445).

A common method of applying low and oscillatory shear stress in macro- or micro-scale systems is by using an externally programmable fluidic pump that provides the desirable flow profile. However, to parallelize experiments from such pumps, one has to either connect multiple platforms to one pump with a preprogrammed profile [30] (that is commonly applied to all connected platforms), or has to connect multiple pumps with each its own programmed profile to different platforms. Because standard fluidic pumps can be bulky and expensive, such an experimentation setup has limited scalability, making it impractical to run simultaneous multiplexed experiments. Microfluidic on-chip peristaltic pumps can generate low shear oscillatory flows, but inherently cannot have dynamic control over the OSI, as the oscillatory nature of the flow is dictated by a predefined valve geometry and actuation sequence [33]. In contrast, in some embodiments, the Low-Oscillatory Flow Generator Module 240 allows for dynamic control of the flow oscillation along with a lowered fluid shear stress, to produce a unique flow oscillation for each connected culture chamber module. In some embodiments, Module 240 further uses on-chip valve modulation to generate a fluidic profile independent of the fluidic pump connected to the device. In some embodiments, the miniaturization of Module 240 allows many modules to be integrated into a microfluidic device, the low cost associated with fabrication, resulting in inexpensive parallelization.

Accordingly, in some embodiments, the low oscillatory flow generator operates without an independent source of pressure (e.g., independent of the flow generator, independent of an external pump providing input to the flow generator/waveform generator). In this manner a single pump can be advantageously used to operate (ultimately) the functionalities of both the waveform generator and the oscillatory/low oscillatory/low flow generator.

In some embodiments, fluid from a location upstream of the desired low/low oscillatory/oscillatory flow region (e.g., region 234, FIG. 2) is shunted to a region downstream of that flow region (e.g., via shunt 271), whereby it can contribute a pressure component applied at the downstream end of region 234 that is opposite to the direction of fluid flow in region 233). In this manner, a waveform input from the upstream end of the region 234 can be modified. The modulation of the regional flow in this low flow region 234 can result in a variety of spatio-temporal profiles in the low flow region. In some embodiments, such as shown in FIG. 2, the low flow region 234 is downstream of a high flow region 233, optionally wherein there is a low-resistance discharge path 235 intersecting the main flow path between the high flow and low flow regions.

In some embodiments, the flow profile in the low shear stress region is modulated without downstream flow shunting (e.g., through shunt 271) as described above. This can be achieved, for example, by varying a resistance downstream of the low flow region 234, such as, for example by changing the degree of closure of Valve 1 (241). In addition, the relative closures of one or more of valves 232, 237 and 241 can be coordinated with valve 242 permanently closed, thereby producing modulated flow patterns. Further, Valve 2 (242) can be permanently closed while modulation of valves (232, 237 and 241), thereby also producing modulated flow patterns.

Generating flows with dynamically controllable fluid OSI can address issues that have not been fully explored with existing macro- or micro-scale platforms. By studying the relative effects of shear stress magnitude and extent of oscillatory flow using embodiments of the invention such as Module 240, issues relating to the onset, sustenance, and reversibility of endothelial dysfunction, as well as cellular dysfunction associated with a variety of other diseases, can be examined. Module 240 is useful for studying cellular diseases such as atherosclerosis and is also useful for conducting clinical or biological research concerning biological systems affected by an oscillatory flow environment.

Cell Culture Module

FIGS. 5A-5D illustrate a subset of the functionality of the Cell Culture Module 230 according to the embodiment shown in FIG. 2. In the embodiments shown in FIG. 2 and FIGS. 5A-5D, Cell Culture Module 230 includes three branches: the lower left branch 233 experiencing laminar flows of high shear stress, lower right branch 234 experiencing oscillatory flow of low shear stress, and a top right branch 235 as an accessory channel for fluid perfusion or cell recovery. Further, the generated flows experienced in the branches can have a variety of shear stress magnitudes. In some embodiments, high shear stress can be above about 8 dynes/cm$^2$ and low shear stress can be below about 8 dynes/cm$^2$. Shear stress conditions can be selected based on a variety of experimental needs, including, for cellular experiments, the type of cells used. In some embodiments, the ratio of high shear stress to low shear stress is about 2:1, 4:1, 10:1, 20:1, 50:1, 100:1, or 1000:1. In some embodiments, the high shear stress is above about 2, 4, 10, 25, 50, 100, or 200 dynes/cm$^2$; and the low shear stress is below about 0.1, 0.2, 0.5, 1, 2, 4, 10, 25, 50, or 100 dynes/cm$^2$. The placement of the accessory channel 235 can be below the lower right branch 234, or even out of plane.

Figures 5A, 5B:
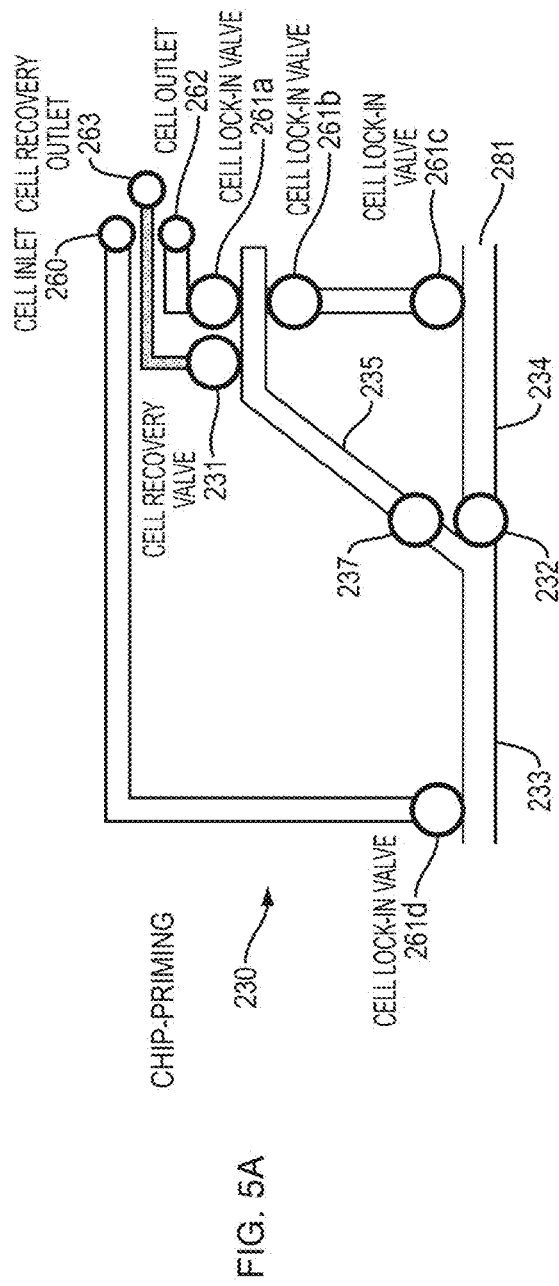

FIG. 5A illustrates an example of Chip Priming of Module 230. Areas of the Module 230 can be appropriately treated for cell culture. This may involve surface treatment, functionalization or other application specific preparation of culture chambers. Cell loading and perfusion allow for cell culture with regions that may each experience different flow conditions.

In one example of Cell Loading, shown in FIG. 5B, Mod. Valve 1 (214) from Flow Waveform Generator Module 210 and both valves (241 and 242) of the Low-Oscillatory Flow Generator Module 240 are closed; after Cell Loading, Cell Lock-in Valves (261a-d) are closed. In some embodiments, cells are introduced into the Module 230 using methods other than the Cell Loading shown in FIG. 5B. For example, in some embodiments, Module 230 can be partially assembled, allowing cells to be grown in the various cell culture regions of the module followed by further assembly of the module to encapsulate the culture regions within. In such embodiments, some of the valves (such as the cell loading valves) shown in the embodiments of FIGS. 2 and 5 may be unnecessary.

Several scenarios illustrating the operation of Cell Culture Module 230 can be envisioned.

Scenario 1: Creating Regions that experience fluidic flow with High and Low Laminar Shear Stress, with or without Flow Oscillation. In the embodiment shown in FIG. 5B, cells of interest are loaded into the lower left branch 233 and lower right branch 234 through the cell loading channel/Cell Inlet 260. The Cell Lock-in Valves 261a-d and lower branch valve 232 are opened, while top branch valve 237 is closed. In the embodiment shown in FIGS. 2 and 5, the placement of the lower branch valve 232 between the branches 233 and 234 functions to isolate two fluidic regions. This configuration of valves prevents cells from entering the top right branch 235, while cells are homogenously seeded in the lower left branch 233 and lower right branch 234.

Once the cells are ready for fluidic flow experiments, Cell Lock-in Valves 261a-d are closed and top and bottom branch valves 232 and 237 are kept open. During experimentation, the Flow Waveform Generator Module 210 and the Low-Oscillatory Flow Generator Module 240 can be operated in accordance with the experimental context. In this manner, two cellular regions (233 and 234) within the same cellular monolayer are created, with each region experiencing a different flow condition that is dynamically controlled and monitored.

Scenario 2: Creating Regions of Flow and No-Flow. Chip Priming, shown in FIG. 5A is followed by Cell Loading, shown in FIG. 5B. After Cell Loading and the cells are ready for fluidic experiments, the Cell Lock-in Valves 261a-d are closed.

In the scenario shown in FIG. 5C, the lower branch valve 232 is closed prior to initiating the flow experiments, resulting in a cell Population 1 in region 233 experiencing a flow condition and a cell Population 2 in region 234 experiencing a no-flow condition, and also being isolated from Population 1. In this scenario, the Low-Oscillatory Flow Module 240 is not used. The Flow Waveform Generator Module 210 can be used depending on the experimental context. The liquid perfused over Population 1 in the lower left branch 233 will contain secreted factors from Population 1 only and its analysis is useful for understanding cell secretory profile under the corresponding flow condition. In this scenario, the secretory profile of the no-flow Population 2 in region 234, as well as its interaction with any entity in the liquid environment can be assessed though the volume enclosed between the lower branch valve 232 and the valves (241 and 242) of the Low-Oscillatory Flow Generator Module 240. If the perfused liquid contains other entities that interact with the cellular monolayer, they can be collected in a likewise manner for each respective cellular population. Therefore, in this scenario, the cell loading and perfusion protocols are useful for comparing the effects of flow versus no-flow conditions on different regions of the same cell culture.

Scenario 3: Creating a Homogeneous Region under Unidirectional Flow. If the cells are cultured or loaded in branches 233 and 235, the lower branch valve 232 may be kept closed while the top branch valve 237 is opened during cell loading and running flow experiments. The Low-Oscillatory Flow Module 240 valves (241 and 242) can both be closed to create a fluidic path which traverses through the lower left branch 233 and top right branch 235 of the network. The Flow Waveform Generator Module 210 can be used as desired. This configuration of valves allows cells to be confined in the lower left branch 233 and top right branch 235 and allows the cells to experience the same flow condition assuming branches 233 and 235 have similar channel designs. Similarly, analysis of the liquid perfused over this monolayer enable studies of cellular factors secreted or entities perfused over the cellular region under such flow profiles.

Scenario 4: Creating a Homogeneous Region under Oscillatory Flow. In this scenario, a cell population that uniformly experiences oscillatory flow is created. As shown in FIG. 5B, cells of interest are loaded into the lower left branch 233 and lower right branch 234 through the cell loading channel 260. However, before the cells are mobilized, lower branch valve 232 is closed and the top branch valve 237 is opened, such that cells in the lower left branch 233 can be selectively washed off from the device either through the cell outlet 262 or though the cell recovery valve 231. However, if the cells are already cultured or mobilized in lower branch 233, the cells can be selectively removed from the device using a suitable cell detachment method while keeping valve 232 closed. Therefore, all of the remaining cells will be confined in the lower right branch 234. Subsequently, lower branch valve 232 and top branch valve 237 can be opened and the Flow Waveform Generator Module 210 and Low-Oscillatory Waveform Module 240 can be used as desired. Once again, the liquid perfused over the lower right branch 234 (with, or without any interacting entities) can be analyzed to understand the impact of flows upon a homogenous cellular region.

Cell Recovery

Referring to the scenario shown in FIG. 5C, following flow experimentation, can be selectively recovered from the lower left branch 233 (Population 1) and the lower right branch 234 (Population 2). Specifically, Population 1 can be recovered by opening top branch valve 237 and closing lower branch valve 232, while keeping cell lock-in valves 272 closed. The placement of the lower branch valve 232, right after the junction of the top right branch 235, ensures proper spatial separation of the two cell populations. As previously discussed, the placement of the lower branch valve 232 may vary while still ensuring proper spatial separation of the two cell populations. It should be appreciated that mixing of cell populations can be limited by many approaches, such as by additional configurations of valves. In one embodiment, oscillatory valves 241 and 241 are closed, such that even when valve 232 is open, there is no flow through region 234 exiting the downstream end of that region.

Subsequently, cells in Population 1 can be mobilized with any suitable cell detachment methodology, and flushed out of the device, such as through the cell recovery outlet 263. If desired, the flow channels can be flushed by an appropriate liquid that ensures all cells are removed efficiently, and thereby preventing cell population cross contamination. Finally, as shown in FIG. 5D, the lower right branch valve 232 is opened, and the cells are detached by any appropriate means and flushed out of the device, such as through the cell recovery outlet 263. Therefore, the cellular sub-populations of interest can be systematically retrieved for off-chip analysis.

In Scenario 2, the cell recovery process is essentially identical to that of Scenario 1. In both Scenario 3 and 4, as there is a homogeneous cell population, cells can be mobilized and recovered simultaneously, such as through the cell recovery outlet 263.

In some embodiments, therefore, the invention provides for the application of different to conditions to different populations of cells such as for example, to different regions of cell culture. These different flow conditions can include, for example, a high shear laminar flow in one region and a dynamically configurable, second flow pattern in an adjacent region. Advantageously, some embodiments provide a uniformity of flow profile across the length of one or both of regions 233 and 234, so that all similarly situated cells in a subpopulation are exposed to the same flow conditions, e.g., to the same spatio-temporal flow profile at different points along the net flow direction. The uniformity can exist across all or substantially all of the length of the region. Accordingly, some embodiments of the invention provide advantages over many microfluidic devices with continuous spatial shear gradients [34, 35], wherein each cell experiences different shear stimulus and it is impractical to define and recover a homogeneous subpopulation, and over cone-plate systems [40] where there may be no clear boundary between flow regions. In addition, unlike some embodiments of the present invention, these methods/devices do not create a region that experiences no-flow while another experiences a definable flow condition.

In some embodiments, cells can be isolated or removed from each sub-region without needing to disassemble the device and physically/manually remove cells, from each region cf. [37], e.g., by using ports as described above. This advantageously permits an examination of cells to complement image-based assays, to which some systems have been limited for practical reasons (e.g., some vertical step flow device platform, which are not amenable for convenient cell recovery [26, 38, 39]). Most microfluidic devices for studying cells can only subject cells to high shear [29] or low-oscillatory shear stress [33], it is usually not possible to create two unique subpopulations.

In some embodiments, if disassembly of parts of the device is desired in order for the cells to be isolated or removed from each sub-region, the cell recovery protocols may be modified or adapted to preserve the device performance and utility.

Further, in some embodiments, as described above, the ability to choose between a variety of operating scenarios (such as Scenarios 1-4) from the same platform makes the module versatile and applicable for a large number of experiments. The use of the branch valves makes it easy to precisely define as well as recover cell subpopulations of interest. Creating sub-populations such as those explained for Scenarios 1 and 2 can then allow for relative analysis, where one population can be a reference or an internal control for the other, from the same device and experimental setup. Furthermore, the ability to selectively sample secreted factors or entities interacting with cellular sub-populations will provide unique insight into cellular functions and interactions under defined flow conditions.

It should be appreciated that a wide variety of cell and tissue types can be studied in accordance with aspects of the present invention, including without limitation, plant cells, animal cells, mammalian cells, yeast, bacterial cells, human cells (such as endothelial cells). Principles of the invention can also be used to model flow for other applications.

In some embodiments, based on the application, including the analyte of interest (e.g., cells), devices described herein, or one or more modules, components, channels, valves, etc., thereof, are of microscale or nanoscale dimensions.

Multidirectional Flow in Cell Culture Module

Atheroprotective and atheroprone flows can have unique spatial characteristics. Atheroprotective flows, although laminar, can have a helical flow profile while atheroprone flows are multidirectional and chaotic. The Cell Culture Module 230 as shown in FIG. 2, incorporates unidirectional and bidirectional flows upon cell culture. The Module 230 can be modified to incorporate multidirectional flows in the atheroprotective and atheroprone regions. Specifically, modifying a surface (e.g., top surface) of the cell culture branches of Module 230 dictates the respective spatial flow profiles, while maintaining the functionality of the Modules 210 and 240.

Helical Flow Generation by Slanted Grove Design.

In order to generate helical flows in microchannels, patterned grooved surfaces [41] may be incorporated on a surface of the device, such as the top surface (ceiling) of the cell culture channel. FIG. 6A is a diagram of a herringbone design pattern showing patterned grooves facing in the reverse direction of the fluidic flow. Slanted groves are patterned to introduce left-handed or right-handed helical flows. The groove depth ratio to the channel height, aspect ratio, groove angle and orientation and number of groves can all be predetermined in a particular device design to achieve predictable helical flow profiles in a channel [42]. This type of surface design can be incorporated with the lower left branch 233 that experiences high shear stress.

Helical Flow Generation by Herringbone Design

Figure 6B:
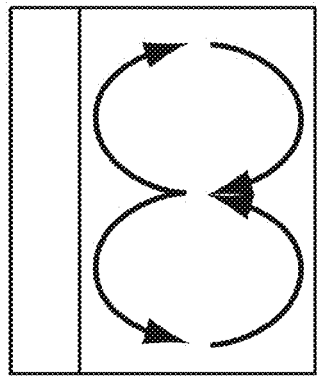
FIG. 6B is an illustration of a cross section of a channel showing counter-rotating helical flows.

FIG. 6B is an illustration of a cross section of a channel showing counter-rotating helical flows. Two spiraling flows (one clockwise and the other counter-clockwise) are created and their relative lateral position in the channel depends on the orientation of the herringbone grooves (facing forward or reverse with respect to the flow direction) [43]. This type of fluid flow can mimic helical flows observed in-vivo, which have both types of spiraling flows [9]. This aspect of the spatial signature of atheroprotective flows can be applied to flows in the lower left branch 233 of the Cell Culture Module 230. Similar to the slanted groove design, various parameters of the herringbone geometric design parameters can be determined tune transverse flows and to attain a specific helical flow profile.

Chaotic Multidirectional Flow Generation by Staggered Herringbone Design

Figure 6C:
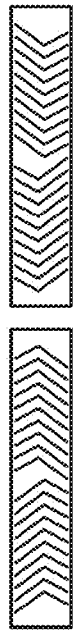
FIG. 6C illustrates the top-views of variants of herringbone and slanted groove designs.
Figure 6C:
Figure 6C:
Figure 6A:
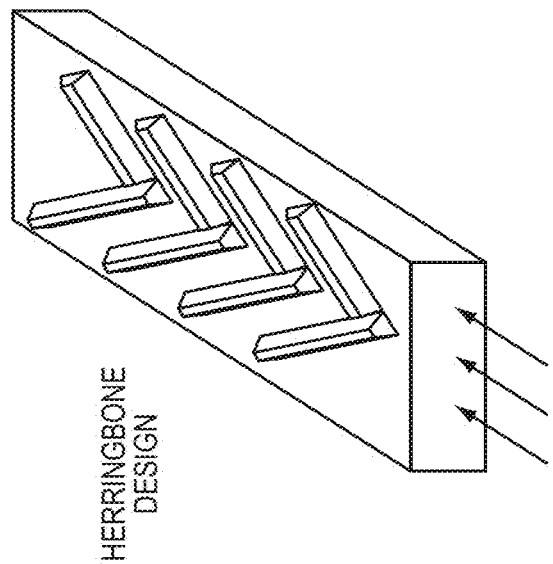
FIG. 6A is a diagram of a herringbone design pattern showing patterned grooves facing in the reverse direction of the fluidic flow.

In order to mimic chaotic behavior of disturbed or atheroprone flows, a staggered herringbone design [41] is incorporated into the microchannels. The chaotic behavior of fluids when such designs are combined in microchannels is known [44, 45]. In some embodiments, variations of the herringbone design can be used on the surface of the lower right branch 233 cell culture channel, which experiences low shear stress with an oscillatory profile. A staggered herringbone design style provides multidirectional flows in this region 233, further enhancing the atheroprone profile. FIG. 6C illustrates the top-views of some possible variants of the herringbone and slanted groove designs. Some embodiments can use any combination of the patterned groove designs shown in FIG. 6C on any of the cell culture branches of Module 230, thereby resulting in multiple device design variants. An embodiment may incorporate multidirectional flows into both the atheroprotective channel (with helical flows) and the atheroprone channel (with chaotic flows). In some embodiments, a patterned groove design (e.g., herringbone) can be used to create a multidimensional flow from a laminar flow; in other embodiments, a patterned groove design (e.g., herringbone) can be used to modify an existing multidimensional flow profile, e.g., by transforming it into another multidimensional flow profile.

Multidirectional flows are exceptionally challenging to recreate within in-vitro cell culture platforms. In the realm of macro-scale platforms, it is possible to find to-scale platforms or flow devices which apply flow rates similar to normal cardiac output, in order to model the complex in-vivo hemodynamics [46]. Such typically custom-made devices are not necessarily designed or used for cell culture assays and are not amenable for parallelized experimentation. To simulate atheroprone spatial profiles, turbulent flows and flows with recirculating eddies have been applied on cell cultures by either using cone-plate viscometers [40, 47] (with modified cone angles, velocities and fluidic viscosity), or in parallel plate devices which perfuse large volumetric flow rates through a sudden flow expansion area[48].

Advantageously, some embodiments of the present invention provide a greater versatility and capability than existing devices. For example, turbulent or turbulent-like flow conditions (with Reynolds numbers ranging from 100 s-1000 s) can be fine-tuned to have a low shear stress, flow can be reversed, or a flow with a defined temporal shear stress waveform can be imposed on the turbulent region.

In this regard, some embodiments of the invention allow for advantageous creation of chaotic flows, e.g., by providing multidirectional flow upon cell culture, without needing to generate turbulent flows. Operating under low Reynolds number flows[41], some embodiments makes it possible to more closely recapitulate the multidirectional disturbed flow phenomenon in a microfluidic cell culture environment, thereby miniaturizing a more representative atheroprone flow condition. Combined, as in some embodiments, with the ability to further impose lowered shear stress with a controllable oscillatory profile, this presents an ability to recapitulate atheroprone flows.

Flow helicity can have stabilizing effects on the flow turbulence caused in disturbed flows, or in stenotic areas [49]. Consequently, much work has been done in designing and optimizing geometric parameters of surgical grafts or tubes (for example, those used in end-to-side vascular grafts) to incorporate helical flows. This often requires introducing helical grooves in the tube or having the tube conform into a helical shape[50]. Despite this knowledge, it has not yet been demonstrated that helical flows observed in vivo can be recapitulated within any in vitro system for cell culture and shear stress studies. Even if such tubes or grafts are modified to enable cell culture, it would be challenging to monitor or image cells within a circular tube which itself can have a three-dimensional shape. In the field of microfluidics, helical and chaotic flows have been studied extensively as they enable efficient micromixing at low Reynolds numbers[51]. In some cases patterned micro-grooves have been incorporated for mixing reagents to, or from cells[52], or have been used to sort cells[53]. However, such patterned grooves in microdevices have not yet been used to assess impact of helical flows upon cell culture, and especially in the context of endothelial biology.

Hence, some embodiments of the invention enable systematic studies of precisely defined helical flows upon cell culture. Some embodiments may set device designs (through the fabrication process, or through active surface modifications [54]) to vary the secondary flow characteristics. Combined with the use of the Flow Waveform Generator Module 210, the resulting helical flows enables a realistic representation or approximate representation of the spatio-temporal profile of atheroprotective flows observed in vivo. Culture of primary human cells in these devices can enable a vast number of in vitro studies that can provide insight into human cellular pathophysiology under sophisticated flow profiles.

Experimental Results

Figure 7A:
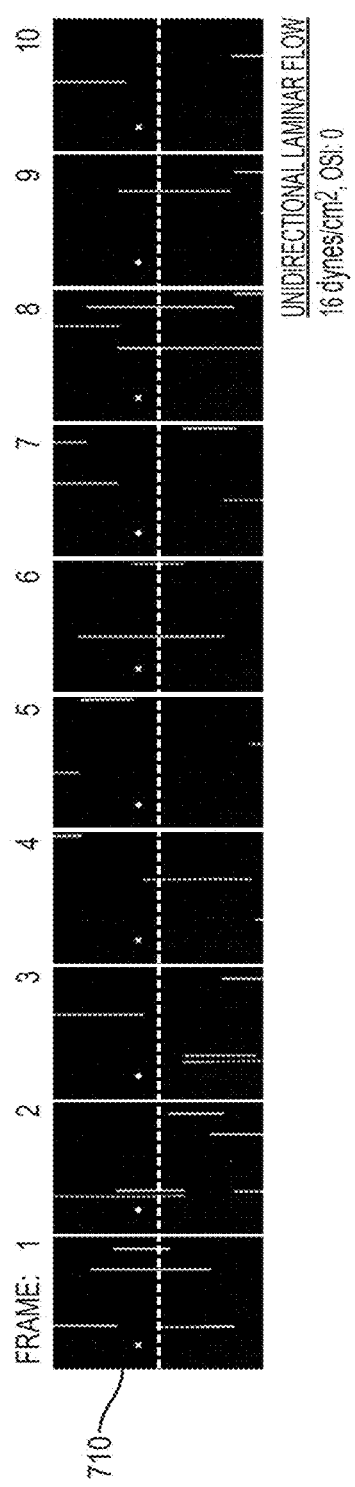
FIG. 7A is a set of images showing unidirectional laminar flow in the lower left branch with physiologic flow generated by an embodiment of the invention. Each consecutive frame is numbered, with an approximately 65 millisecond delay between frames. The dashed line indicates the middle of the channel, and the overall flow direction is from the top to the bottom of each frame.
Figure 7B:
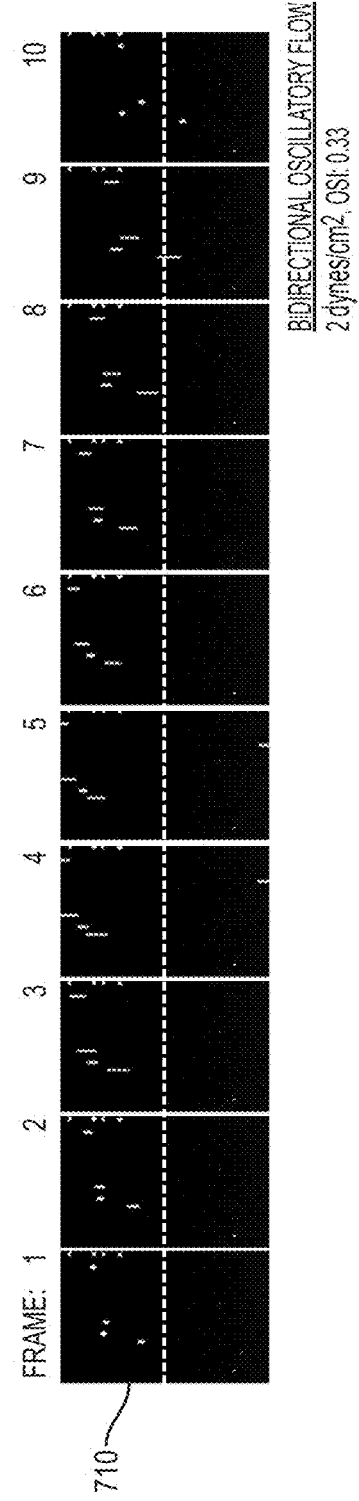
FIG. 7B is a set of images showing bidirectional oscillatory fluidic flow with pathological flow, as generated in accordance with aspects of the invention. Each consecutive frame is numbered, with an approximately 65 millisecond delay between frames. The dashed line indicates the middle of the channel, and the overall flow direction is from the top to the bottom of each frame.

A three-branch microfluidic device was designed according to the embodiment illustrated in FIG. 2. The lower right branch channel 234 of Module 230 was connected to a fluidic resistance eight-fold higher than that of the lower left 233 and top right branch 235. The lower right branch channel 234 was also connected to modulation valves functioning as the valves in the Low-Oscillatory Flow Generator Module 240. The fluidic network was setup identical to that shown in FIG. 2, but without a Flow Waveform Generator Module 210. The flow conditions were set such that the lower left branch 233 experienced unidirectional physiological fluid shear stress of 16 dynes/cm$^2$. The Low-Oscillatory Flow Generator 240 produced an OSI of 0.33, in the typical range of atheroprone flows. The perfused fluid contained fluorescent microbeads and a video was recorded to assess flow profiles. Ten consecutive and representative frames from the videos for the lower left and right branch are shown in FIG. 7A and (b) respectively. In FIGS. 7A and 7B, the overall flow direction is from the top to the bottom of each frame and a dashed red line 710 provides reference to the middle of the channel.

As shown in FIG. 7A, unidirectional laminar flow in the lower left branch 235 is demonstrated by long continuous fluorescent streaks, indicating fast bead flow. As shown in FIG. 7B, bidirectional oscillatory flow is observed as growing and shrinking fluorescent streaks, indicating an increasing and decreasing bead velocity. FIG. 7B shows that the beads move upwards for the first five frames and then downwards for the latter five. As the flow is not purely oscillatory (OSI is less than 0.5), the final position of the beads is further down the channel, confirming a net positive flow direction. Finally, the average of the maximum streak lengths observed in FIG. 7B was found to be approximately eight fold less than that from FIG. 7A, which proves that the flow rate in FIG. 7B was eight fold lower, as intended. In this manner, the results from FIG. 7 demonstrate generation of two unique flow profiles in the lower left 233 and right branches 234 of the device, with controllable shear stress and oscillatory shear indices. Hence, with similar controlled flows, any cells cultured in the device branches will experience the atheroprotective high laminar shear flows and low shear oscillatory flows in the regions 233 and 234 shown in FIG. 2.

Figure 8A:
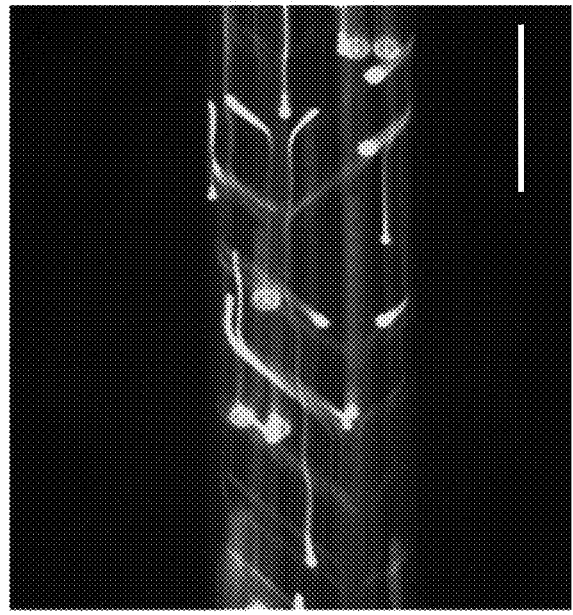
FIG. 8A is an image of chaotic multidirectional flows with very low shear stress generated in accordance with an embodiment of the invention. The net flow direction is from the left to the right of each frame. The image acquisition has a two second exposure for ease of streamline visualization. The depicted scale bar represents 250 µm.
Figure 8B:
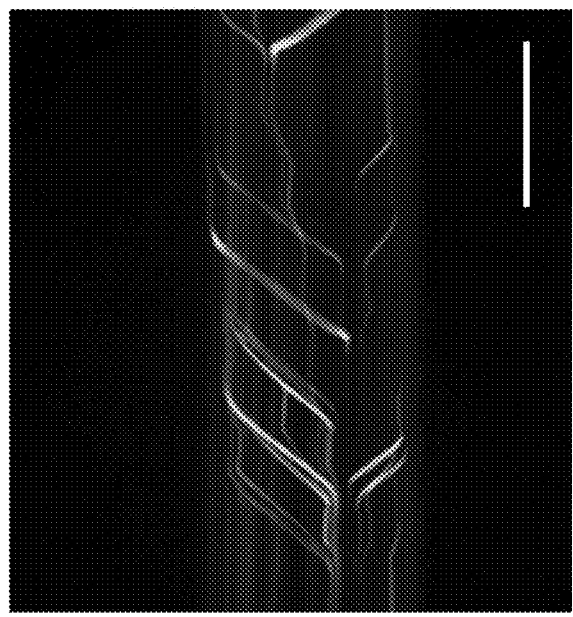
FIG. 8B is an image of a flow generated in accordance with an embodiment of the invention with the flow having no oscillation, low shear stress and flow reversal. The net flow direction is from the left to the right of each frame. The image acquisition has a two second exposure for ease of streamline visualization. The depicted scale bar represents 250 µm.

A representative staggered herringbone device design was tested with the same experimental setup with or without the Low-Oscillatory Flow Generator 240. As shown in FIG. 8(a), chaotic flow was observed with even a very low shear stress of 0.5 dynes/cm$^2$. FIG. 8A also shows fluorescent bead streamlines which orient in unique directions, indicative of chaotic flow. At a net forward shear stress of 2 dynes/cm$^2$, fluid oscillation of 0.33 OSI was applied and the resultant bead flow patterns were recorded. FIG. 8B shows the significantly different bead flow profiles, demonstrating multidirectional flow. The bead trajectories show that the trailing end of the bead streak becomes narrower, further away from the bead. This phenomenon is representative of beads moving in and out of focus in their unique three-dimensional trajectories, therefore appearing to have such 'comet-like' tails. In contrast to FIG. 8A, in FIG. 8B, it is possible to observe the ends of the leading end of a fluorescent streak, which suggests that the bead flow was halted, likely due to flow oscillation. Further time-lapse imaging of beads flowing with these conditions showed flow direction reversal, with unique bead trajectories (fluorescent streaks) in each recorded frame. The results show incorporation of oscillatory multidirectional flow with a low shear stress magnitude, which may directly applied on underlying cell culture.

Additional Details

An embodiment of the present invention is illustrated by the use of a microfluidic device constructed by microfabrication and standard soft lithography techniques [57]. In FIG. 9 and FIG. 10, embodiments of fluidic valve are shown which comprise elastomeric pressure-responsive membranes that regulate fluid flow in a microchannel [58]. It should be appreciated that a variety of device fabrication and assembly methods, architectures, as well as a variety of valve construction materials could be alternatively employed to achieve similar device functionality. It should be further be appreciated that the valves could be constructed, assembled or employed at various scales including but not limited to nano- micro- or macro-scales, with a variety of fabrication materials such as polymeric, metallic or other materials, and actuated with various stimuli, including but not limited to electrical, mechanical or chemical actuators.

Figure 9A:
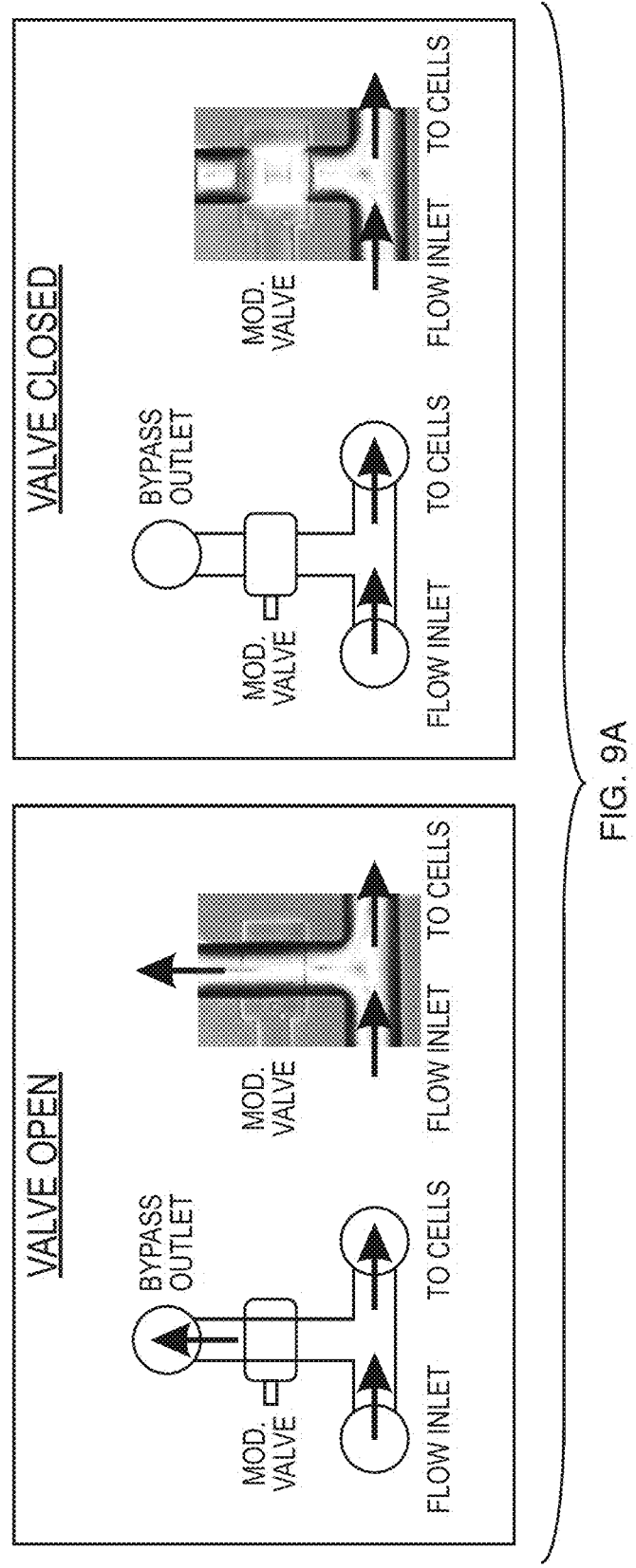
FIG. 9A depicts cases of an open and closed Mod. Valve as a schematic, and also on a constructed embodiment of the device, according to aspects of the invention.
Figure 10:
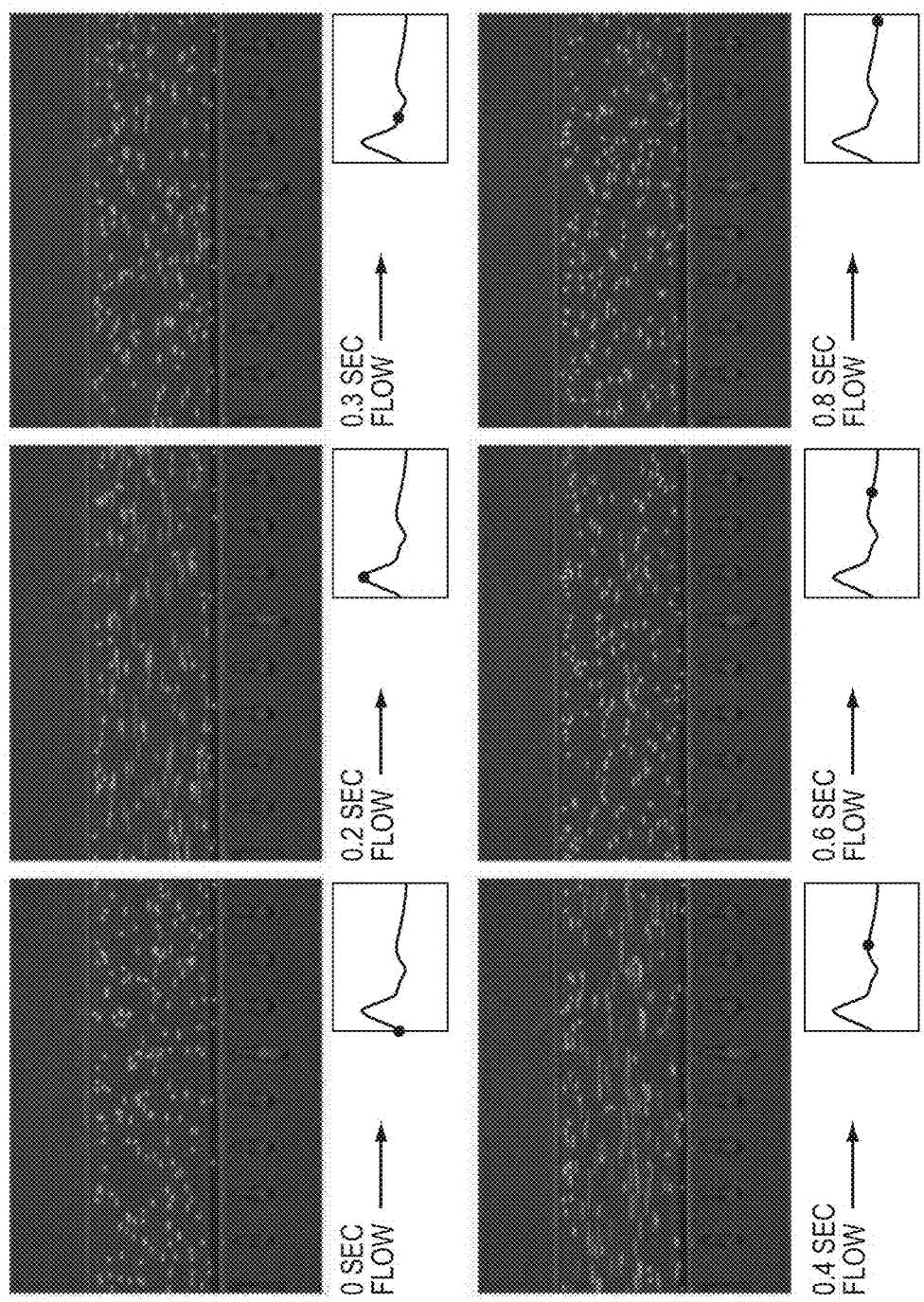
FIG. 10 depicts the use of a Flow Waveform Generator Module in relation to bead flow trajectories, according to aspects of the invention.

An embodiment of the Flow Waveform Generator Module within a microfluidic device is depicted in FIG. 9. FIG. 9A depicts cases of an open and closed Mod. Valve as a schematic, and also on a constructed embodiment of the device. When open, some fraction of the input flow (from 312) could be diverted to the outlet (311) and to cells (399), and when fully closed, all flow was diverted to cells, similar to what is illustrated in FIG. 3A. FIG. 9B illustrates scenarios when Mod. Valve 2 was kept open, while Mod. Valve 1 was either fully open, fully closed, partially open or partially closed. It should be appreciated that valve positions (open, closed, or intermediate) can be specified by a variety of stimuli, including but not limited to mechanical pressure, electrical voltage, etc. Such valve configurations, demonstrated on an embodiment of the device, substantiate successful ability to modulate valve positions for consequent creation of flow waveforms.

An example of an application of the Flow Waveform Generator Module is depicted in FIG. 10. Sequentially recorded frames of fluorescent 2 micron bead flow trajectories from a top-view are illustrated within an embodiment of the device. Here, the application of a typical atheroprotective waveform (at a frequency equivalent to 80 heartbeats per minute) by the Flow Waveform Generator Module resulted in time-varying bead flows, which corresponded to anticipated profiles from the waveform. This result demonstrated a functional utility of the Flow Waveform Generator Module to allow programmable flow profiles within the device.

Figure 11:
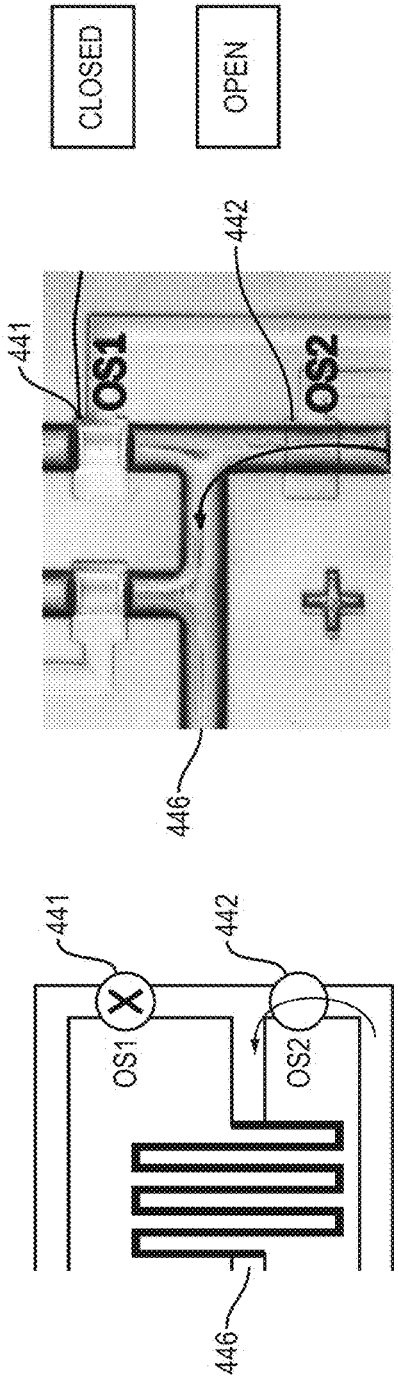
FIG. 11 depicts an example of a Low-Oscillatory Flow Module, showing two possible operational states, both as a schematic, and in a constructed embodiment of the device, according to aspects of the invention.
Figure 11:
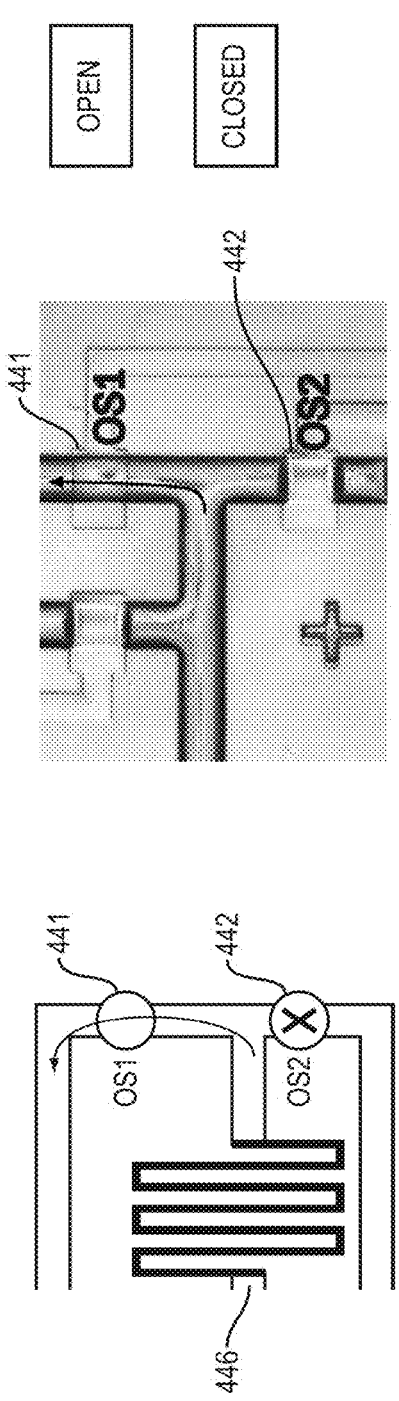

A functional Low-Oscillatory Flow Module is depicted in FIG. 11 showing two operational states, both as a schematic, and as present in a constructed embodiment of the device. Here, the particular embodiment comprised a microfluidic device constructed by standard microfabrication techniques, utilizing elastomeric valves. In one state, Oscillatory Valve 1 (OS1 or 441) was closed while Oscillatory Valve 2 (OS2 or 442) is open. In another state, OS1 was open, while OS2 was closed, in accordance to mechanisms presented in FIG. 4.

Figure 12:
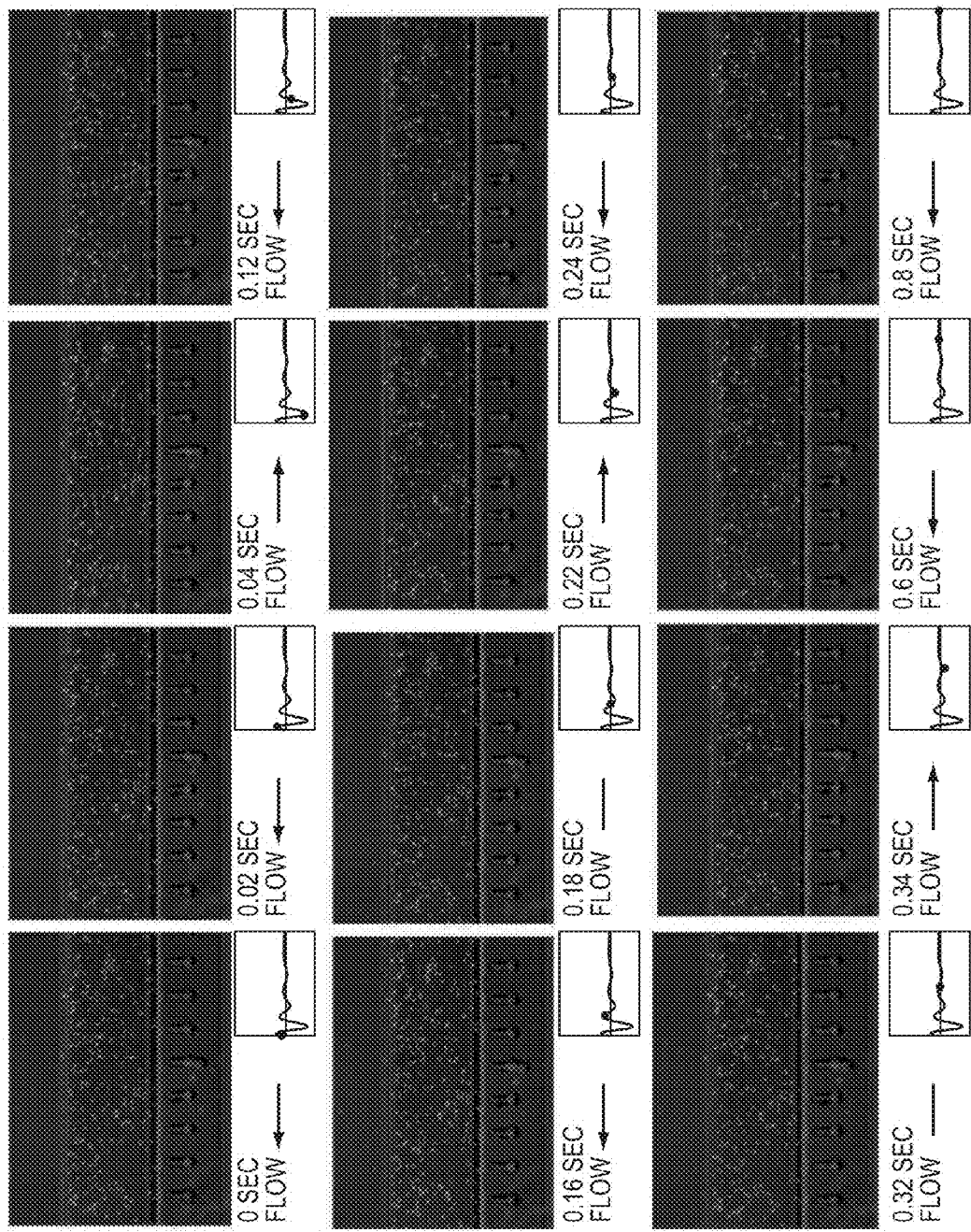
FIG. 12 depicts an example application of a Low-Oscillatory Waveform Generator according to aspects of the invention.

An example application of the Low-Oscillatory Waveform Generator is depicted in FIG. 12. Sequentially recorded frames of fluorescent 2 micron bead flow trajectories from a top-view are illustrated within an embodiment of the device, following the application of a typical Atheroprone waveform at a frequency equivalent to 80 heartbeats per minute. Images were captured with a long-exposure of 800 milliseconds, encompassing one complete waveform period. Several low-flow rate oscillations, or flow directional reversals could be obtained, indicated by small bead 'streaks' which proceed in reversing directions in accordance to applied Atheroprone profiles. These results demonstrated a successful validation of a Low-Oscillatory Flow Module.

Figure 13:
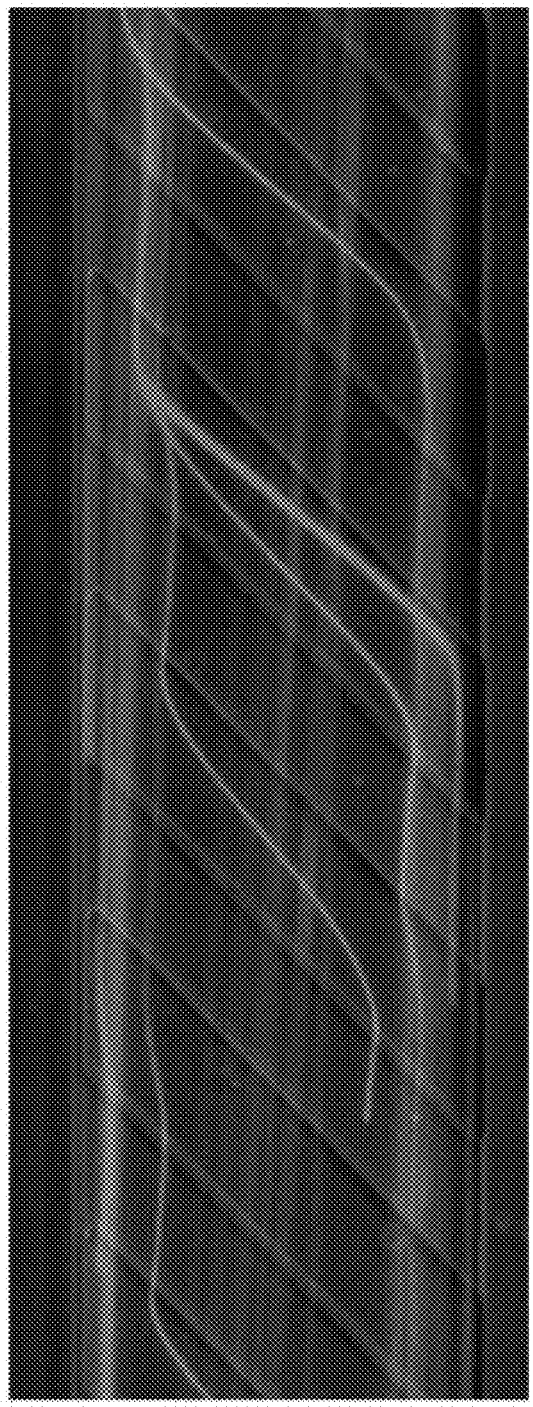
FIG. 13 depicts helical flow generation, according to aspects of the invention.

Helical flow generation was demonstrated in FIG. 13, within an embodiment of the device, where a slanted groove design was employed. From the top-view of the fluidic channel, it was possible to observe trajectories of fluorescent 2 micron microbeads flowing through the channel. Here, one could observe distinct bead trajectories at distinct focal planes of the device. Specifically, as shown the image is focused at the top of the device where the bead trajectories in focus and are oriented towards the top right (or to the left of the channel cross-section). On the other hand, bead trajectories in lower depth of the channel, which are out of focus, were oriented towards the lower right direction of the top view (or to the right of the channel cross section). Collectively, in this embodiment, these trajectories were reflective of a counter-clockwise helical flow generated through an input flow that was unidirectional and uniform. Simultaneous generation of such trajectories within an example of the slanted groove device design, validated a successful generation of helical flow.

Figure 14:
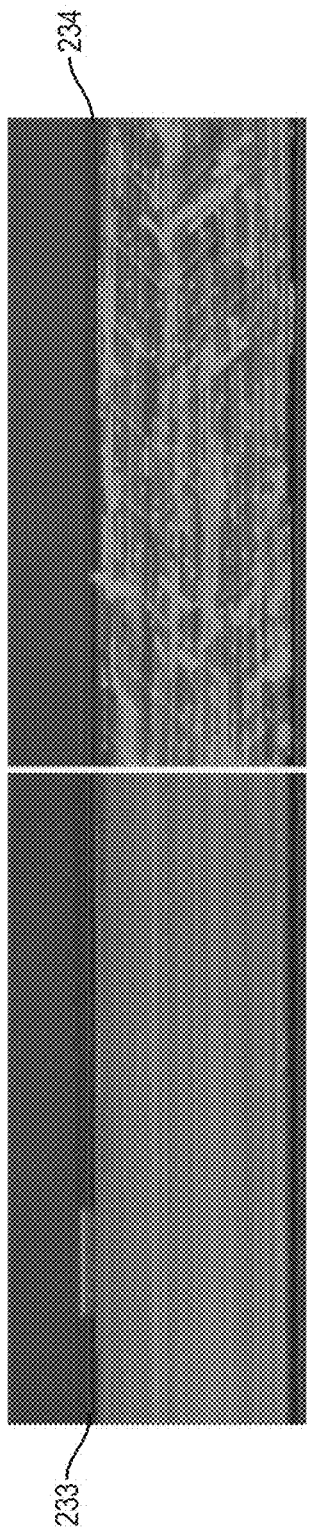
FIG. 14 depicts simultaneous generation of spatio-temporal flows in an embodiment of the present invention.

An instance of simultaneous generation of spatio-temporal flows in an embodiment of the device is shown in FIG. 14. Long-exposure images capturing fluorescent bead flow trajectories within the branches 233 and 234 demonstrated unique flow profiles within each region. In this instance, branch 234 had staggered herringbone grooves (similar to those shown in FIG. 6C) that created multidirectional flows, while branch 233 has no grooves, and hence had unidirectional flows. Long, straight and continuous flow streamlines within branch 233 depicted Atheroprotective flow profiles exclusively in the intended branch. Simultaneously, programmed Atheroprone flows, with shorter, discontinuous and multidirectional flow streamlines were reproduced exclusively in branch 234, as intended. These results successfully demonstrated the ability to simultaneously control, and reproduce Atheroprotective and Atheroprone spatiotemporal flow profiles within a single device environment.

Figure 15:
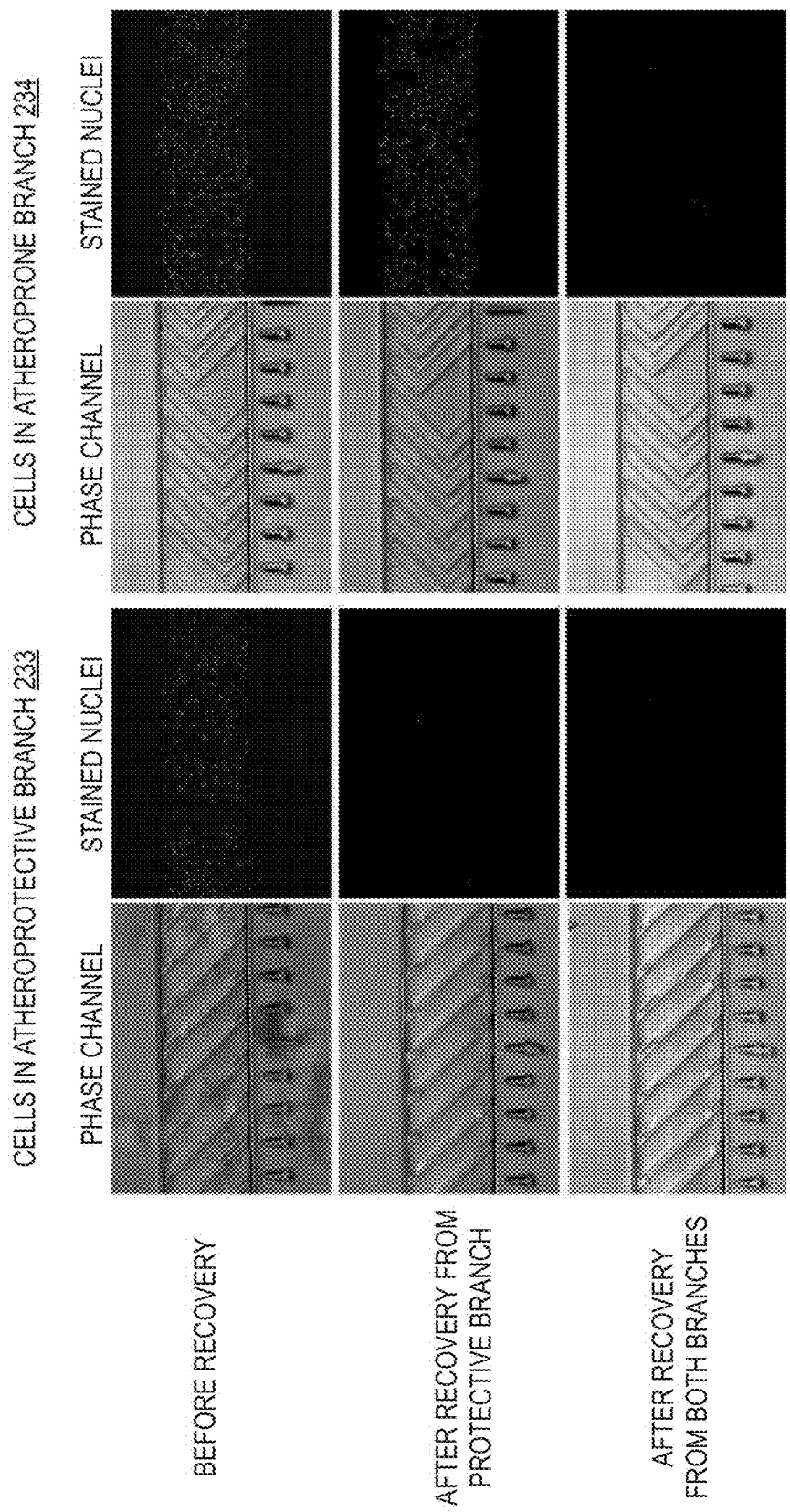
FIG. 15 depicts specific recovery of cells from Atheroproective and Atheroprone branches within an embodiment of a device relating to the present invention.

Specific recovery of cells from Atheroproective and Atheroprone branches (233 and 234 respectively) within an embodiment of the device is shown in FIG. 15. Prior to recovery, mammalian cells were shown to be successfully cultured within respective branches, in this case with some in branch 233 with slanted grooves (that recreate helical flow), and some in branch 234 with staggered herringbone grooves (that recreate chaotic flows). Cellular nuclei were stained with a fluorescent marker, making them easier to visualize and track. Similar to the scenario explained in FIG. 5C, FIG. 15 shows cells from branch 233 could be isolated and recovered exclusively, while maintaining cells in branch 234. The absence of stained nuclei within branch 233 and the presence of stained nuclei in branch 234 following recovery demonstrated the ability to recover cells exclusively from the intended branch. Subsequent recovery of cells from branch 234 (as explained in FIG. 5D) showed that no cells remained in that branch, verifying precise cell recovery. Taken together, FIG. 15 demonstrated an ability of the Cell Culture Module described in this embodiment to specifically isolate cells from desired branches successfully.

REFERENCES

1. Chiu, J. J., S. Usami, and S. Chien, Vascular endothelial responses to altered shear stress: pathologic implications for atherosclerosis. Ann Med, 2009. 41(1): p. 19-28.
2. Chiu, J. J. and S. Chien, Effects of disturbed flow on vascular endothelium:
pathophysiological basis and clinical perspectives. Physiol Rev, 2011. 91(1): p. 327-87.
3. Davies, P. F., Hemodynamic shear stress and the endothelium in cardiovascular pathophysiology. Nat Clin Pract Cardiovasc Med, 2009. 6(1): p. 16-26.
4. Kwak, B. R., et al., Biomechanical factors in atherosclerosis: mechanisms and clinical implications. Eur Heart J, 2014. 35(43): p. 3013-20, 3020a-3020d.
5. Gimbrone, M. A., Jr. and G. Garcia-Cardena, *Vascular endothelium, hemodynamics, and the pathobiology of atherosclerosis*. Cardiovasc Pathol, 2013. 22(1): p. 9-15.
6. Cunningham, K. S. and A. I. Gotlieb, *The role of shear stress in the pathogenesis of atherosclerosis*. Lab Invest, 2005. 85(1): p. 9-23.
7. Malek, A. M., S. L. Alper, and S. Izumo, *Hemodynamic shear stress and its role in atherosclerosis*. JAMA, 1999. 282(21): p. 2035-42.
8. Dai, G., et al., Distinct endothelial phenotypes evoked by arterial waveforms derived from atherosclerosis-susceptible and -resistant regions of human vasculature. Proc Natl Acad Sci USA, 2004. 101(41): p. 14871-6.
9. Frazin, L. J., et al., *Functional chiral asymmetry in descending thoracic aorta.* Circulation, 1990. 82(6): p. 1985-94.
10. Morbiducci, U., et al., A rational approach to defining principal axes of multidirectional wall shear stress in realistic vascular geometries, with application to the study of the influence of helical flow on wall shear stress directionality in aorta. J Biomech, 2015. 48(6): p. 899-906.
11. Liu, X., et al., Physiological significance of helical flow in the arterial system and its potential clinical applications. Ann Biomed Eng, 2015. 43(1): p. 3-15.
12. Kilner, P. J., et al., Helical and retrograde secondary flow patterns in the aortic arch studied by three-directional magnetic resonance velocity mapping. Circulation, 1993. 88(5 Pt 1): p. 2235-47.
13. Ku, D. N., et al., Pulsatile flow and atherosclerosis in the human carotid bifurcation. Positive correlation between plaque location and low oscillating shear stress. Arteriosclerosis, 1985. 5(3): p. 293-302.

14. Gallo, D., et al., Helical flow in carotid bifurcation as surrogate marker of exposure to disturbed shear. J Biomech, 2012. 45(14): p. 2398-404.
15. Morbiducci, U., et al., Helical flow as fluid dynamic signature for atherogenesis risk in aortocoronary bypass. A numeric study. J Biomech, 2007. 40(3): p. 519-34.
16. Chen, Z., et al., Swirling flow can suppress flow disturbances in endovascular stents: a numerical study. ASAIO J, 2009. 55(6): p. 543-9.
17. Getz, G. S. and C. A. Reardon, *Animal models of atherosclerosis*. Arterioscler Thromb Vasc Biol, 2012. 32(5): p. 1104-15.
18. Vilahur, G., T. Padro, and L. Badimon, *Atherosclerosis and thrombosis: insights from large animal models*. J Biomed Biotechnol, 2011. 2011: p. 907575.
19. Libby, P., P. M. Ridker, and G. K. Hansson, *Progress and challenges in translating the biology of atherosclerosis*. Nature, 2011. 473(7347): p. 317-25.
20. Davies, P. F., et al., A spatial approach to transcriptional profiling: mechanotransduction and the focal origin of atherosclerosis. Trends Biotechnol, 1999. 17(9): p. 347-51.
21. Xu, Q., Mouse models of arteriosclerosis: from arterial injuries to vascular grafts. Am J Pathol, 2004. 165(1): p. 1-10.
22. Benam, K. H., et al., *Engineered in vitro disease models*. Annu Rev Pathol, 2015. 10: p. 195-262.
23. Esch, E. W., A. Bahinski, and D. Huh, *Organs-on-chips at the frontiers of drug discovery*. Nat Rev Drug Discov, 2015. 14(4): p. 248-60.
24. Blackman, B. R., G. Garcia-Cardena, and M. A. Gimbrone, Jr., A new in vitro model to evaluate differential responses of endothelial cells to simulated arterial shear stress waveforms. J Biomech Eng, 2002. 124(4): p. 397-407.
25. Frangos, J. A., L. V. McIntire, and S. G. Eskin, *Shear stress induced stimulation of mammalian cell metabolism*. Biotechnol Bioeng, 1988. 32(8): p. 1053-60.
26. Chiu, J. J., et al., Analysis of the effect of disturbed flow on monocytic adhesion to endothelial cells. J Biomech, 2003. 36(12): p. 1883-95.
27. Resnick, N., et al., Fluid shear stress and the vascular endothelium: for better and for worse. Prog Biophys Mol Biol, 2003. 81(3): p. 177-99.
28. Davis, C. A., et al., Device-based in vitro techniques for mechanical stimulation of vascular cells: a review. J Biomech Eng, 2015. 137(4): p. 040801.
29. Young, E. W. and C. A. Simmons, Macro- and microscale fluid flow systems for endothelial cell biology. Lab Chip, 2010. 10(2): p. 143-60.
30. Booth, R., S. Noh, and H. Kim, A multiple-channel, multiple-assay platform for characterization of full-range shear stress effects on vascular endothelial cells. Lab Chip, 2014. 14(11): p. 1880-90.
31. Estrada, R., et al., Endothelial cell culture model for replication of physiological profiles of pressure, flow, stretch, and shear stress in vitro. Anal Chem, 2011. 83(8): p. 3170-7.
32. Song, J. W., et al., Computer-controlled microcirculatory support system for endothelial cell culture and shearing. Anal Chem, 2005. 77(13): p. 3993-9.
33. Shao, J., et al., Integrated microfluidic chip for endothelial cells culture and analysis exposed to a pulsatile and oscillatory shear stress. Lab Chip, 2009. 9(21): p. 3118-25.
34. Wang, J., J. Heo, and S. Z. Hua, Spatially resolved shear distribution in microfluidic chip for studying force transduction mechanisms in cells. Lab Chip, 2010. 10(2): p. 235-9.
35. Zhang, X., et al., A microfluidic shear device that accommodates parallel high and low stress zones within the same culturing chamber. Biomicrofluidics, 2014. 8(5): p. 054106.
36. Chen, H., et al., Cardiac-like flow generator for long-term imaging of endothelial cell responses to circulatory pulsatile flow at microscale. Lab Chip, 2013. 13(15): p. 2999-3007.
37. Phelps, J. E. and N. DePaola, *Spatial variations in endothelial barrier function in disturbed flows in vitro*. Am J Physiol Heart Circ Physiol, 2000. 278(2): p. H469-76.
38. Nagel, T., et al., Vascular endothelial cells respond to spatial gradients in fluid shear stress by enhanced activation of transcription factors. Arterioscler Thromb Vasc Biol, 1999. 19(8): p. 1825-34.
39. Truskey, G. A., et al., Characterization of a sudden expansion flow chamber to study the response of endothelium to flow recirculation. J Biomech Eng, 1995. 117(2): p. 203-10.
40. Garcia-Cardena, G., et al., Biomechanical activation of vascular endothelium as a determinant of its functional phenotype. Proc Natl Acad Sci USA, 2001. 98(8): p. 4478-85.
41. Stroock, A. D., et al., *Chaotic mixer for microchannels*. Science, 2002. 295(5555): p. 647-51.
42. Lynn, N. S. and D. S. Dandy, Geometrical optimization of helical flow in grooved micromixers. Lab Chip, 2007. 7(5): p. 580-7.
43. Foley, J. O., et al., Experimental and model investigation of the time-dependent 2-dimensional distribution of binding in a herringbone microchannel. Lab Chip, 2008. 8(4): p. 557-64.
44. Yang, J. T., K. J. Huang, and Y. C. Lin, *Geometric effects on fluid mixing in passive grooved micromixers*. Lab Chip, 2005. 5(10): p. 1140-7.
45. Williams, M. S., K. J. Longmuir, and P. Yager, *A practical guide to the staggered herringbone mixer*. Lab Chip, 2008. 8(7): p. 1121-9.
46. Huang, R. F., T. F. Yang, and Y. K. Lan, Pulsatile flows and wall-shear stresses in models simulating normal and stenosed aortic arches. Experiments in Fluids, 2010. 48(3): p. 497-508.
47. Davies, P. F., et al., Turbulent fluid shear stress induces vascular endothelial cell turnover in vitro. Proc Natl Acad Sci USA, 1986. 83(7): p. 2114-7.
48. Brooks, A. R., P. I. Lelkes, and G. M. Rubanyi, Gene expression profiling of vascular endothelial cells exposed to fluid mechanical forces: relevance for focal susceptibility to atherosclerosis. Endothelium, 2004. 11(1): p. 45-57.
49. Liu, X., et al., Physiological Significance of Helical Flow in the Arterial System and its Potential Clinical Applications. Ann Biomed Eng, 2015. 43(1): p. 3-15.
50. Caro, C. G., N. J. Cheshire, and N. Watkins, Preliminary comparative study of small amplitude helical and conventional ePTFE arteriovenous shunts in pigs. J R Soc Interface, 2005. 2(3): p. 261-6.
51. Lee, C. Y., et al., *Microfluidic mixing: a review*. Int J Mol Sci, 2011. 12(5): p. 3263-87.
52. Gomez-Sjoberg, R., et al., *Versatile, fully automated, microfluidic cell culture system*. Anal Chem, 2007. 79(22): p. 8557-63.

53. Stott, S. L., et al., Isolation of circulating tumor cells using a microvortex-generating herringbone-chip. Proc Natl Acad Sci USA, 2010. 107(43): p. 18392-7.
54. Liu, D., et al., (Photo-)thermally induced formation of dynamic surface topographies in polymer hydrogel networks. Langmuir, 2013. 29(18): p. 5622-9.
55. Skommer, J. and D. Wlodkowic, *Successes and future outlook for microfluidics-based cardiovascular drug discovery*. Expert Opin Drug Discov, 2015. 10(3): p. 231-44.
56. Bhatia, S. N. and D. E. Ingber, *Microfluidic organs-on-chips*. Nat Biotechnol, 2014. 32(8): p. 760-72.
57. Melin J, Quake S R. Microfluidic large-scale integration: the evolution of design rules for biological automation. Annual review of biophysics and biomolecular structure. 2007; 36:213-31. Epub 2007/02/03. doi: 10.1146/annurev.biophys.36.040306.132646. PubMed PMID: 17269901.
58. Unger M A, Chou H P, Thorsen T, Scherer A, Quake S R. Monolithic microfabricated valves and pumps by multilayer soft lithography. Science. 2000; 288(5463):113-6. doi: DOI 10.1126/science.288.5463.113. PubMed PMID: ISI:000086387700044.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A cell culture platform comprising:
a flow conduit having an upstream port and a downstream port separated by a length of the flow conduit;
a first outlet located on the length of the flow conduit between the upstream port and the downstream port of the flow conduit that divides the flow conduit into an upstream end defined as a section of the flow conduit between the upstream port and the first outlet and a downstream end defined as a section of the flow conduit between the first outlet and the downstream port;
a branch conduit having a first branch port and a second branch port separated by a length of the branch conduit, the first branch port connected to and in fluid communication with the flow conduit upstream port; and
a modulator having a first modulator port, a second modulator port, and a third modulator port in fluid communication; wherein the first modulator port is connected to and in fluid communication with the flow conduit downstream port; the second modulator port is connected to and in variable fluid communication with a second outlet; and the third modulator port is connected to and in variable fluid communication with the second branch port.

2. The cell culture platform of claim 1, further comprising a flow waveform modulator connected to and in fluid communication with the upstream port.

3. The cell culture platform of claim 1, wherein the modulator is an oscillatory flow generator.

4. The cell culture platform of claim 1, wherein the cell culture platform is a microfluidic device.

5. The cell culture platform of claim 1, wherein a section of an interior surface of the flow conduit has a grooved texture.

6. The cell culture platform of claim 5, wherein the grooved texture comprises a herringbone pattern.

7. The cell culture platform of claim 5, wherein the grooved texture is capable of inducing a multidimensional flow pattern in an applied laminar flow, the multidimensional flow pattern existing in at least one of the upstream end and the downstream end of the flow conduit.

8. The cell culture platform of claim 7, wherein the multidimensional flow pattern is a helical flow pattern.

9. The cell culture platform of claim 1, wherein the cell culture platform is capable of inducing a first fluidic flow conditions within the upstream end of the flow conduit and a second fluidic flow conditions within the downstream end of the flow conduit, wherein the first and second flow conditions include at least one of a spatial pattern and a temporal pattern.

10. The cell culture platform of claim 9 wherein the first flow conditions is a laminar, high shear flow and the second flow conditions is a low-oscillatory flow.

11. The cell culture platform of claim 1 wherein the first modulator port and the third modulator port are connected via a first fluid pathway, and the second modulator port is connected to the first fluid pathway via a second fluid pathway that connects to the first fluid pathway at a junction.

12. The cell culture platform of claim 11 wherein the modulator further comprises a fluidic resistor located on the first fluid pathway between the first modulator port and the junction.

* * * * *